(12) United States Patent
Behrangrad

(10) Patent No.: US 10,627,845 B2
(45) Date of Patent: Apr. 21, 2020

(54) CONTROL APPARATUS, CONTROL METHOD, AND CONTROL SYSTEM

(71) Applicant: Panasonic Corporation, Osaka (JP)

(72) Inventor: Mahdi Behrangrad, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1671 days.

(21) Appl. No.: 14/374,659

(22) PCT Filed: Nov. 15, 2013

(86) PCT No.: PCT/JP2013/006715
§ 371 (c)(1),
(2) Date: Jul. 25, 2014

(87) PCT Pub. No.: WO2014/076960
PCT Pub. Date: May 22, 2014

(65) Prior Publication Data
US 2015/0012149 A1    Jan. 8, 2015

(30) Foreign Application Priority Data
Nov. 19, 2012   (JP) .................................. 2012-253622

(51) Int. Cl.
*G05F 1/66* (2006.01)
*H02J 3/14* (2006.01)
(Continued)

(52) U.S. Cl.
CPC .................. *G05F 1/66* (2013.01); *H02J 3/14* (2013.01); *H02J 13/0006* (2013.01);
(Continued)

(58) Field of Classification Search
CPC ....................................................... G05F 1/66
See application file for complete search history.

(56) References Cited

U.S. PATENT DOCUMENTS

| 6,216,956 B1 * | 4/2001 | Ehlers ................ G05D 23/1923 |
| | | 236/47 |
| 7,197,378 B2 | 3/2007 | Sato et al. |

(Continued)

FOREIGN PATENT DOCUMENTS

| JP | 2002-010532 | 1/2002 |
| JP | 2004-088824 | 3/2004 |
| WO | 2009/139426 | 11/2009 |

OTHER PUBLICATIONS

Extended European Search Report dated Jul. 27, 2015 in corresponding European Application No. 13854272.5.
(Continued)

*Primary Examiner* — Jennifer L Norton
(74) *Attorney, Agent, or Firm* — Wenderoth, Lind & Ponack, L.L.P.

(57) ABSTRACT

A DR controller which is connected to a server via a network and performs control on power demand of a load resource includes: a communication determining unit which determines whether or not communication between the server and the DR controller is available; and a control unit which executes one of operation modes including a first mode for controlling the power demand of the load resource according to a predetermined schedule and a second mode for controlling the power demand of the load resource according to an instruction signal from the server. In the case where the determining unit determines that the communication with the server is unavailable when the control is being performed in the second mode, the control unit changes the second mode of the operation modes to the first mode in performing of the control.

12 Claims, 27 Drawing Sheets

(51) Int. Cl.
*H02J 13/00* (2006.01)
*H04L 29/06* (2006.01)

(52) U.S. Cl.
CPC ........ *H04L 67/42* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 8,601,166 B2 | 12/2013 | Fujiwaka | |
| 2004/0207264 A1 | 10/2004 | Sato et al. | |
| 2005/0033707 A1* | 2/2005 | Ehlers | G06Q 10/10 |
| | | | 705/412 |
| 2008/0238710 A1 | 10/2008 | Tolnar et al. | |
| 2009/0198384 A1* | 8/2009 | Ahn | G01D 4/004 |
| | | | 700/292 |
| 2011/0072082 A1 | 3/2011 | Fujiwaka | |
| 2012/0197458 A1 | 8/2012 | Walter et al. | |
| 2012/0271473 A1 | 10/2012 | Koch | |
| 2012/0316693 A1* | 12/2012 | Ogawa | H02J 3/14 |
| | | | 700/295 |
| 2013/0035802 A1* | 2/2013 | Khaitan | G06F 1/263 |
| | | | 700/297 |
| 2013/0197702 A1* | 8/2013 | Arvind | H02J 3/005 |
| | | | 700/286 |
| 2013/0205175 A1* | 8/2013 | Yamada | H04L 41/0631 |
| | | | 714/57 |
| 2013/0289790 A1 | 10/2013 | Park | |
| 2015/0127185 A1* | 5/2015 | Behrangrad | G05B 15/02 |
| | | | 700/297 |
| 2016/0070284 A1* | 3/2016 | Nakamura | H02J 13/0013 |
| | | | 700/286 |
| 2016/0124399 A1* | 5/2016 | Su | G05B 11/01 |
| | | | 700/275 |
| 2016/0330688 A1* | 11/2016 | Kukosa | H04W 52/0274 |
| 2017/0045904 A1* | 2/2017 | Nishita | G06Q 50/06 |
| 2017/0221161 A1* | 8/2017 | Kudo | G06Q 50/06 |
| 2018/0011507 A1* | 1/2018 | Schwarz | G05F 1/66 |
| 2018/0123391 A1* | 5/2018 | Lakamp | H02J 3/381 |
| 2018/0175620 A1* | 6/2018 | Fukuda | H02J 3/14 |

OTHER PUBLICATIONS

International Search Report dated Jan. 28, 2014 in corresponding International Application No. PCT/JP2013/006715.

* cited by examiner

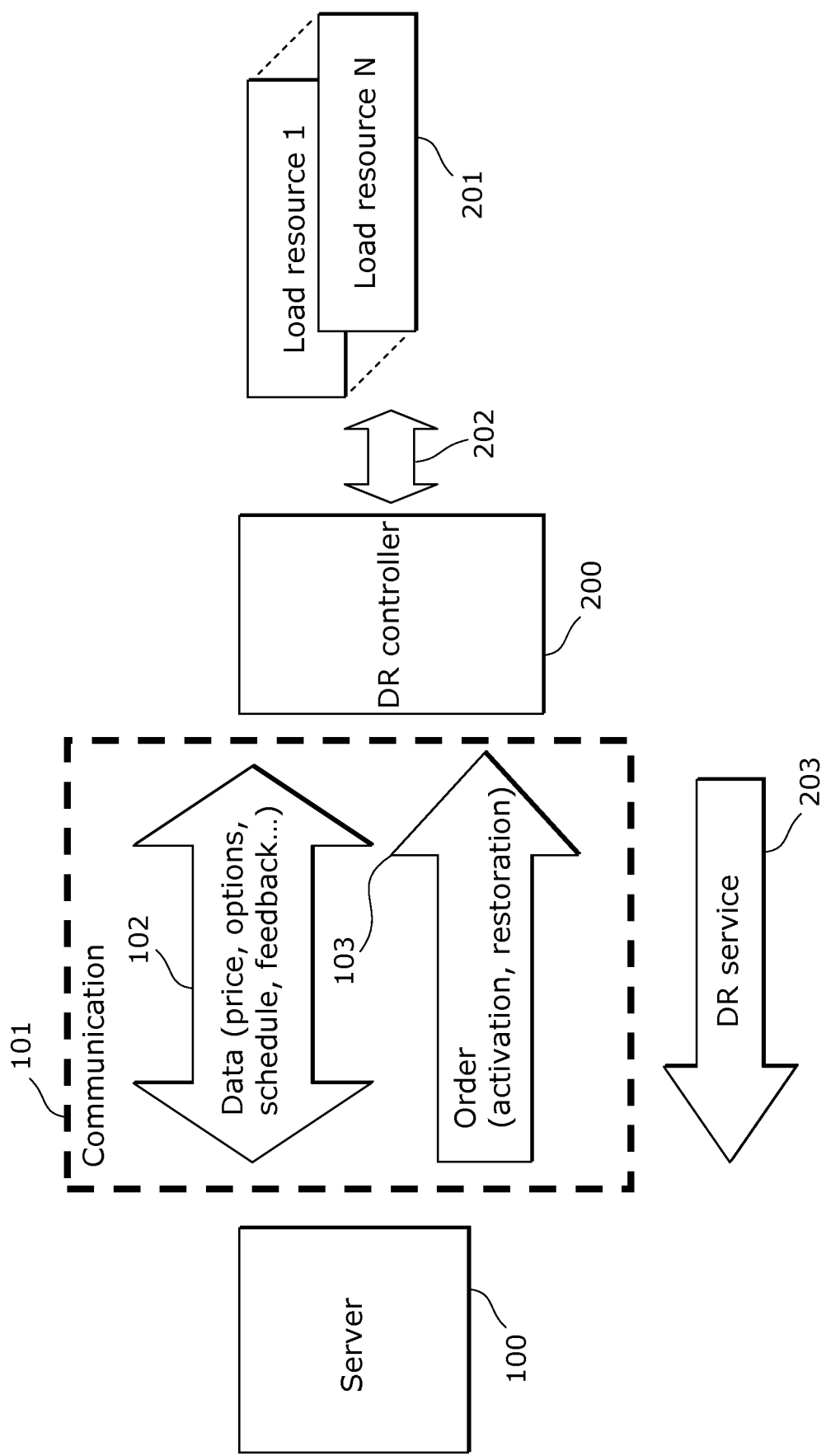

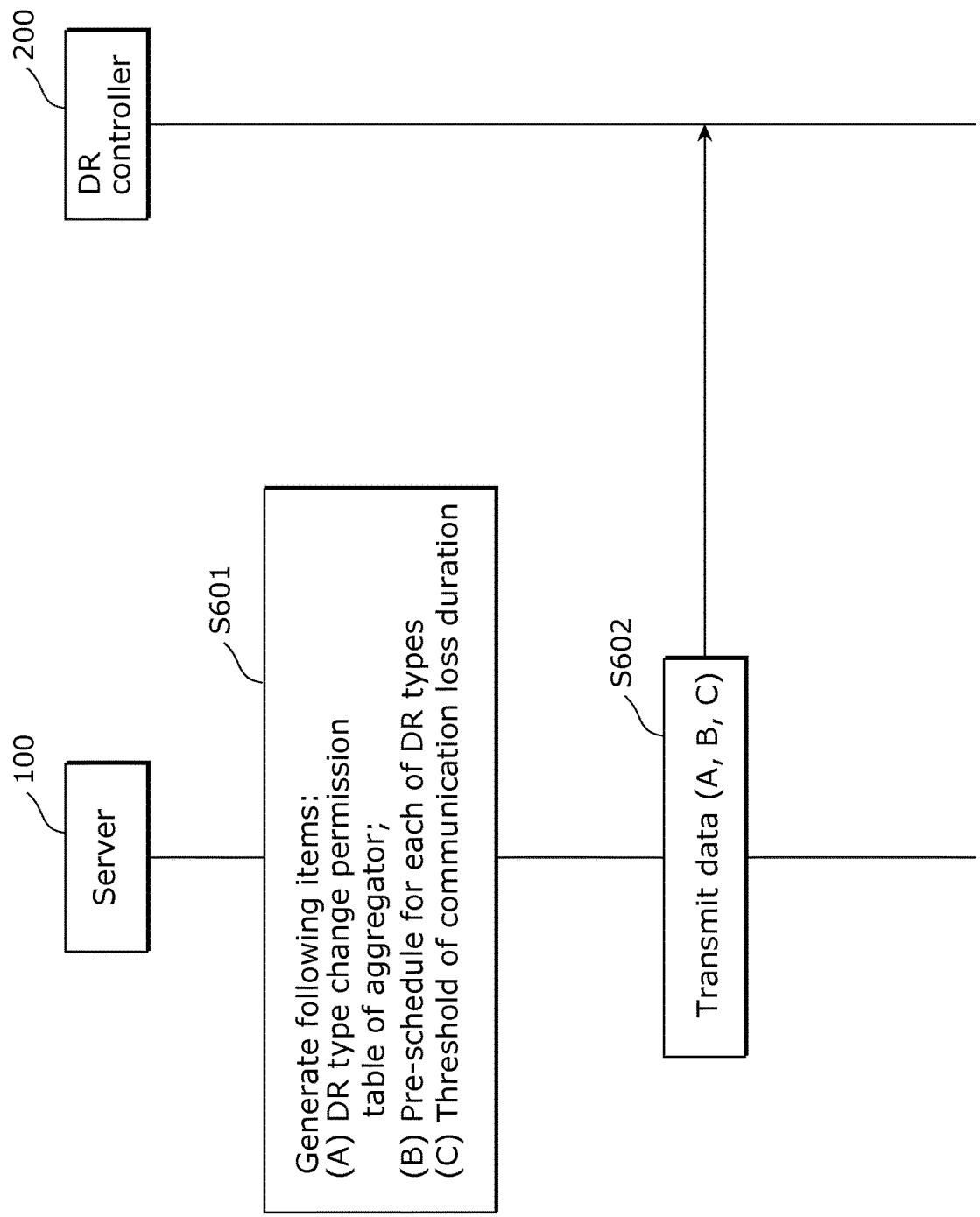

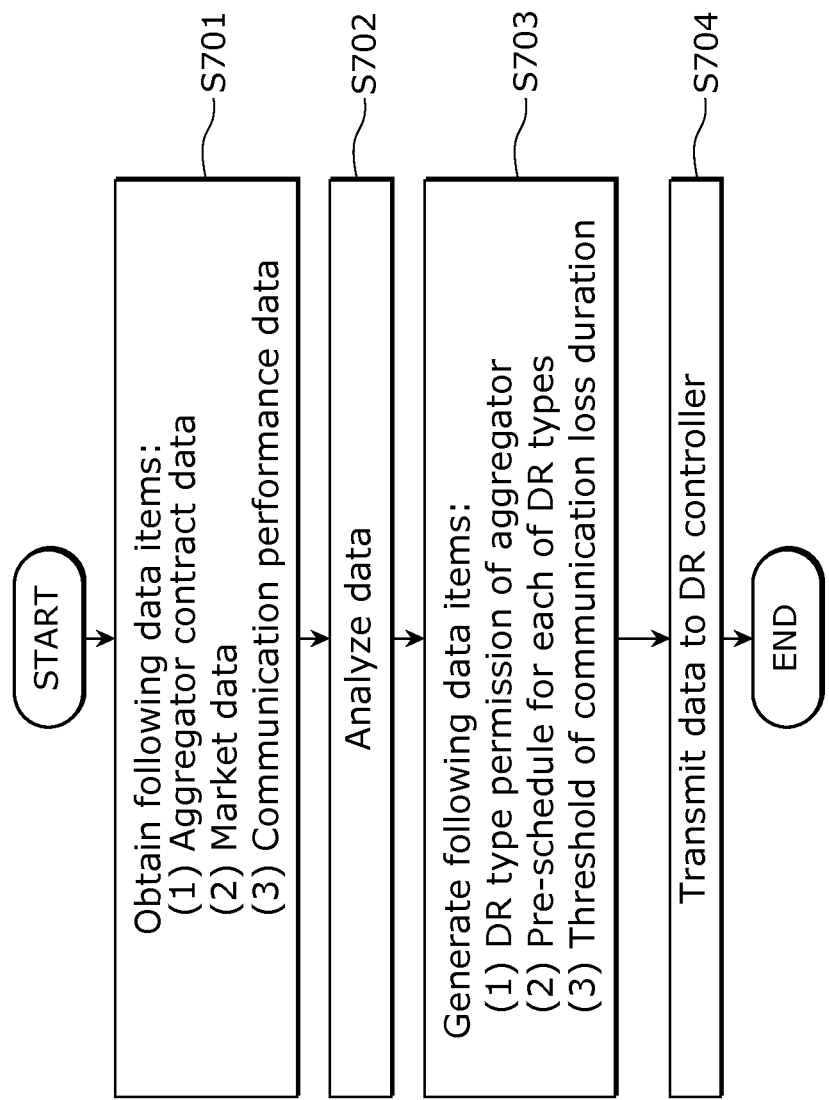

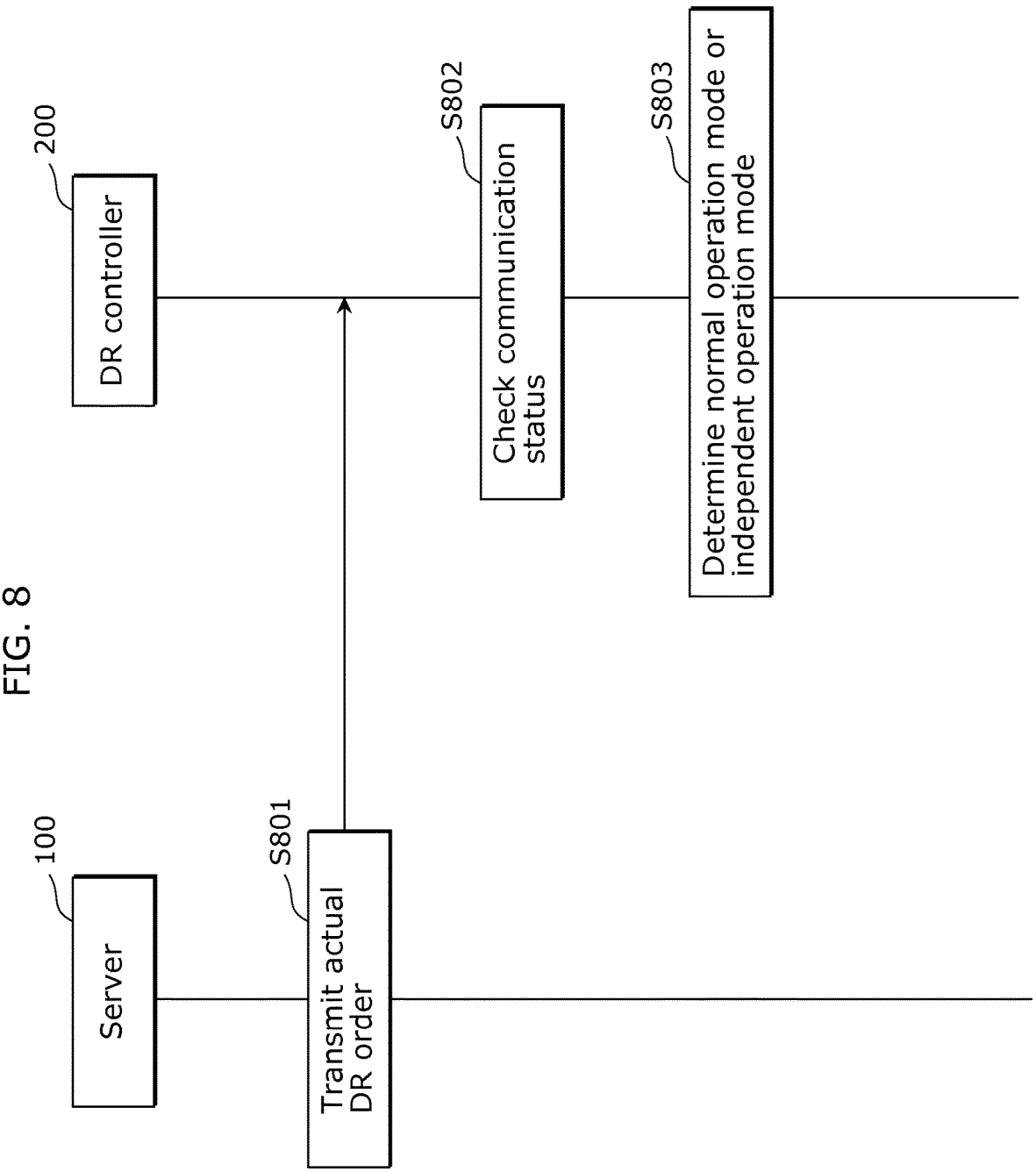

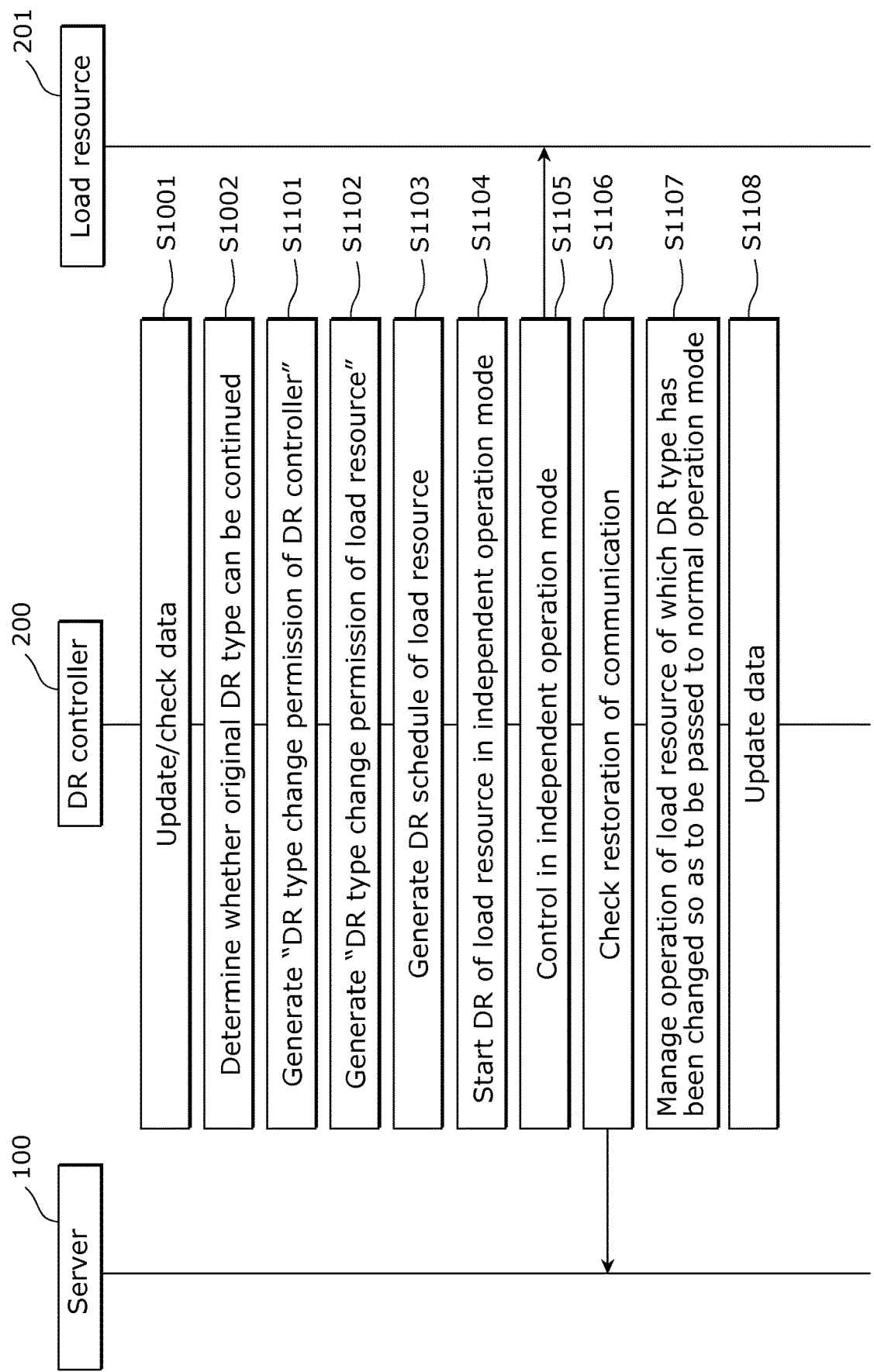

FIG. 11B

|  | | DR types subsequent to change | | |
|---|---|---|---|---|
|  | | Type 1 | Type 2 | Type 3 |
| DR types prior to change | Type 1 | Y | Y | N |
|  | Type 2 | Y | Y | N |
|  | Type 3 | N | N | N |

FIG. 11C

|  | | DR types subsequent to change | | |
|---|---|---|---|---|
|  | | Type 1 | Type 2 | Type 3 |
| DR types prior to change | Type 1 | Y | Y | N |
|  | Type 2 | Y | N | N |
|  | Type 3 | N | N | N |

CONTROL APPARATUS, CONTROL METHOD, AND CONTROL SYSTEM

TECHNICAL FIELD

The present invention relates to a control apparatus, a control method, and a control system, for controlling a load resource.

BACKGROUND ART

Along with the development of smart grids, more demand response (DR) resources are used in energy systems (Patent Literature (PTL) 1, for example). In the system, the scale of DR operation, a start time, and an end time are important aspects. Thus, communication between a server of an aggregator and a local DR controller is indispensable to the success of DR control.

CITATION LIST

Patent Literature

[PTL1] US Patent Application Publication No. 2008/0238710

SUMMARY OF INVENTION

Technical Problem

However, there is a possibility that some troubles occur in communication tools for implementing the above-described communication. When some troubles occur in communication tools, there is a problem that DR control cannot be properly performed.

In view of the above, the present invention provides a control apparatus capable of properly controlling DR even when some troubles occur in the communication tools.

Solution to Problem

A control apparatus according to an aspect of the present invention is a control apparatus which is connected to a server via a network and performs control on power demand of a load resource, the control apparatus including: a determining unit configured to determine whether or not communication between the server and the control apparatus is available; and a control unit configured to execute one of a first mode and a second mode, the first mode being for controlling the power demand of the load resource according to a predetermined schedule, the second mode being for controlling the power demand of the load resource according to an instruction signal from the server, wherein, in the case where the determining unit determines that the communication with the server is unavailable when the control is being performed in the second mode, the control unit is configured to change the second mode to the first mode and perform the control.

General and specific aspects disclosed above may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Advantageous Effects of Invention

According to the present invention, it is possible to properly control DR even when some troubles occur in the communication tools.

BRIEF DESCRIPTION OF DRAWINGS

FIG. 1B is a diagram which illustrates a relationship between a server of an aggregator and a DR controller, according to Embodiment.

FIG. 6A is a sequence diagram of a pre-operation process according to Embodiment.

FIG. 7 is a flowchart illustrating a pre-operation process by the server according to Embodiment.

FIG. 8 is a sequence diagram of selecting an operation type performed by the DR controller in an operation time, according to Embodiment.

FIG. 11A is a sequence diagram of an operation time process performed by the DR controller in the independent operation mode, according to Embodiment.

FIG. 11B illustrates an example of a DR type change permission table of the DR controller according to Embodiment.

FIG. 11C illustrates an example of a DR type change permission table of the load resource according to Embodiment.

DESCRIPTION OF EMBODIMENTS (Underlying Knowledge Forming Basis of the Present Disclosure)

In relation to the control method of DR disclosed in the Background section, the inventors have found the problem described below.

As described above, communication between a server of an aggregator and a local DR controller is indispensable to the success of DR control.

However, there is a possibility that some troubles occur in communication tools for implementing the above-described communication. When communication between a DR controller and a server of an aggregator is interrupted, a DR service is thereby interrupted. Interruption of the DR service brings about financial loss and can also cause reliability issues.

The following describes the above-described problems with reference to a related technique which is related to the present invention. In this description, a start signal is a signal which is transmitted by a server to a DR controller, and is for instructing the DR controller to start control for suppressing power demand of a load resource. In addition, a restoration signal is a signal which is transmitted by the server to the DR controller, and is for instructing the DR controller to end the suppressing of power demand of the load resource to restore the power demand.

Figure 23:
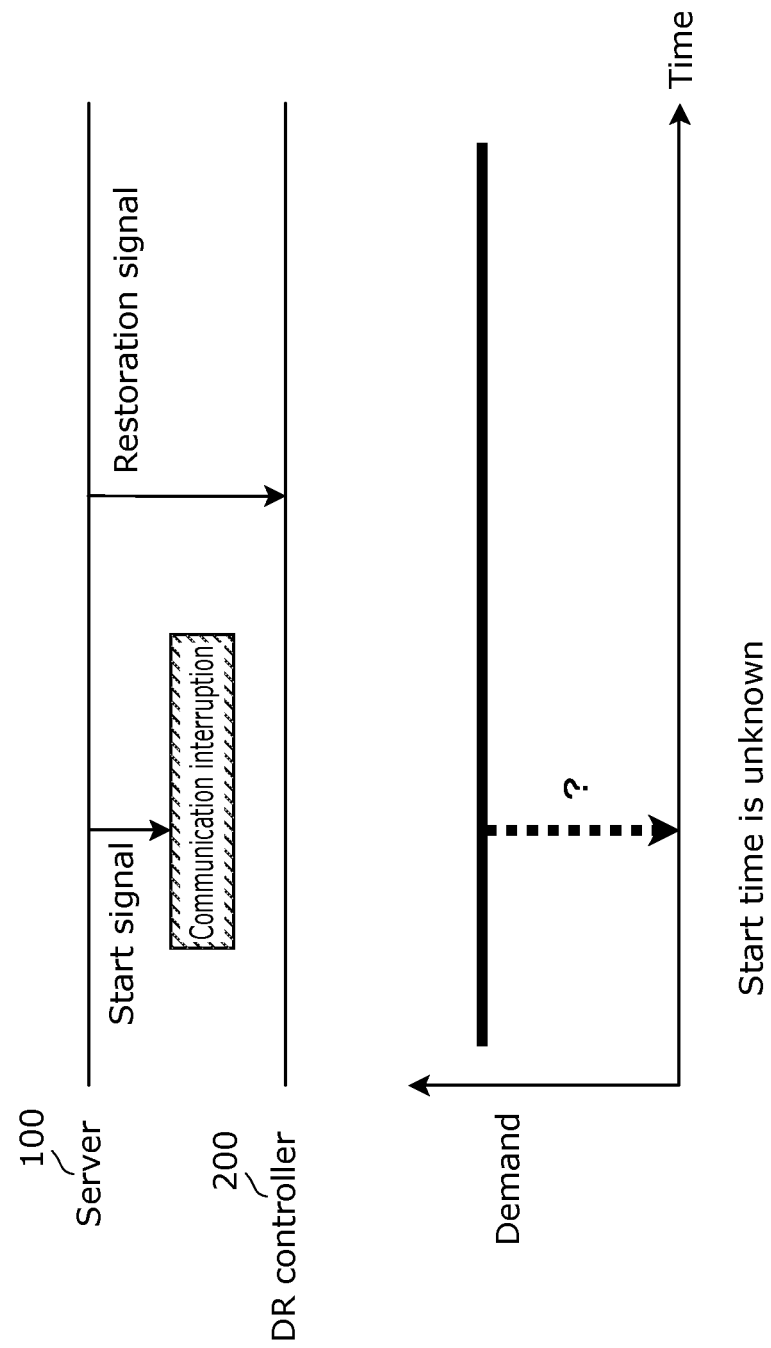
FIG. 23 is a first explanation diagram of a communication status between the server and the DR controller, and power control performed by the DR controller according to a related technique.

FIG. 23 is a first explanation diagram of a communication status between the server and the DR controller, and power control performed by the DR controller, based on a related technique.

FIG. 23 illustrates the case where a server transmits a start signal to a DR controller after communication between the server and the DR controller becomes unavailable. It is to be noted that the hatched portion in the diagram indicates that communication is unavailable. The same description may be used in other diagrams as well.

In this case, the DR controller cannot receive the start signal from the server, and therefore cannot start control for suppressing power demand of the load resource. Accordingly, power demand of the load resource is not suppressed, and DR control fails.

Figure 24:
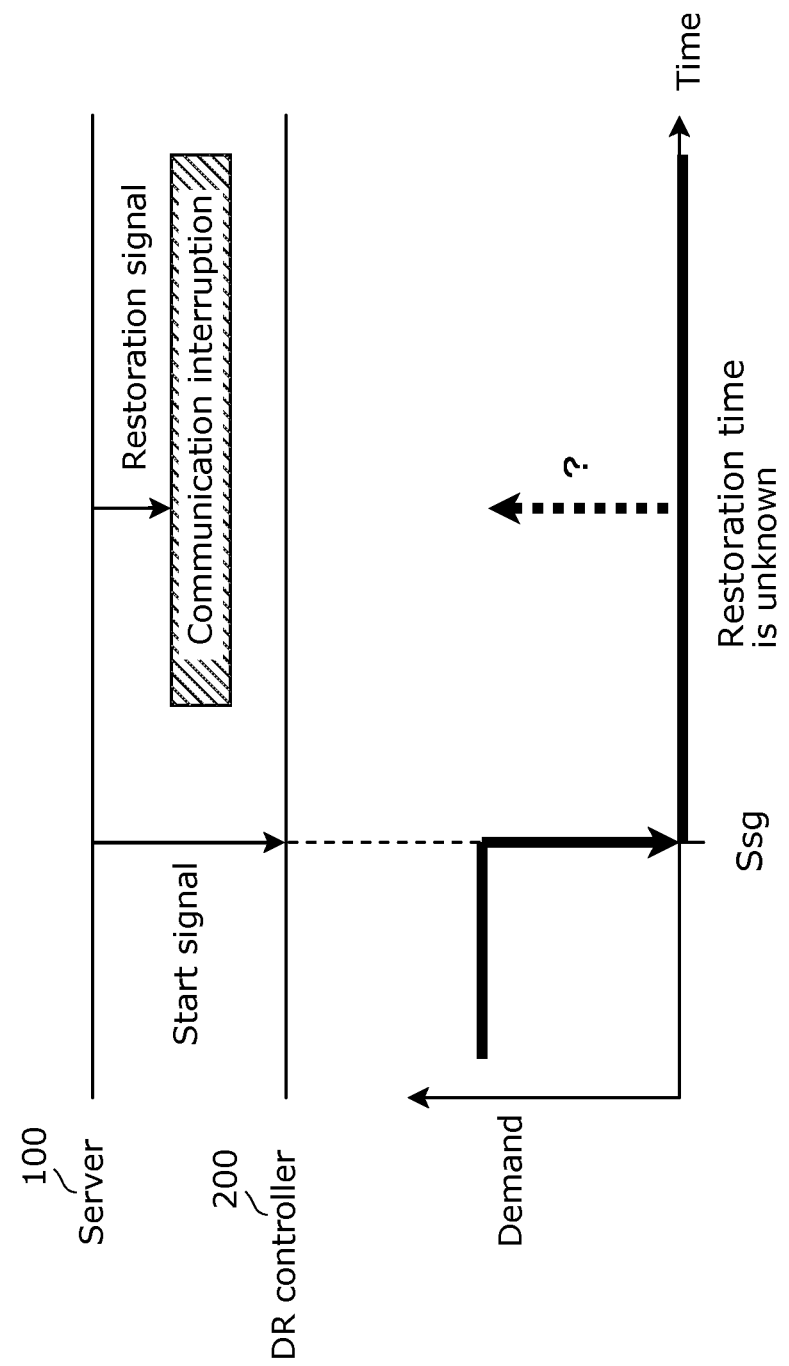
FIG. 24 is a second explanation diagram of a communication status between the server and the DR controller, and power control performed by the DR controller according to a related technique.

FIG. 24 is a second explanation diagram of the communication status between the server and the DR controller, and the power control performed by the DR controller, based on a related technique.

FIG. 24 illustrates the case where communication between a server and a DR controller becomes unavailable after the server transmitted the start signal to the DR controller, and then the server transmits the restoration signal to the DR controller while the communication being unavailable.

In this case, the DR controller can receive the start signal from the server to start control for suppressing power demand of the load resource. However, the DR controller cannot receive the restoration signal from the server, and thus cannot end the suppressing of power demand. As a result, DR control fails, and the load resource cannot be properly used after the control.

In an embodiment according to the present invention, the case including a server of an aggregator (SOA) and a demand response (DR) controller (DRC) is considered. The DRC controls an operation of a plurality of load resources in one premise. The DRC communicates with the server of an aggregator. When communication succeeds, the DRC follows an order of the server of the aggregator However, when communication fails, the DRC has to make DR determination independently. The determination is made such that the difference is the smallest between the DR operation ordered by the server of the aggregator and the DR determination made without communication.

There is also the case where the DRC determines that the DR of the type which is conducted without communication cannot be continued, in such a case, the DRC changes the DR type which has been conducted, taking an important parameter into consideration. In addition, the server of the aggregator should prepare DR estimation data and transfer the DR estimation data previously to the DRC. This should be carried out in order to support the independent operation performed by the DRC when communication fails.

In sum, there is a possibility that some troubles occur in communication tools for implementing the above-described communication. When some troubles occur in communication tools, there is a problem that DR control cannot be properly performed.

In view of the above, the present invention provides a control apparatus capable of properly controlling DR even when some troubles occur in the communication tools.

In order to solve the above-described problems, a control apparatus according to an aspect of the present invention is a control apparatus which is connected to a server via a network and performs control on power demand of a load resource, the control apparatus including: a determining unit configured to determine whether or not communication between the server and the control apparatus is available; and a control unit configured to execute one of a first mode and a second mode, the first mode being for controlling the power demand of the load resource according to a predetermined schedule, the second mode being for controlling the power demand of the load resource according to an instruction signal from the server, wherein, in the case where the determining unit determines that the communication with the server is unavailable when the control is being performed in the second mode, the control unit is configured to change the second mode to the first mode and perform the control.

In other words, a control apparatus according to an aspect of the present invention includes: a first communication circuit that communicates with a server via a first communication network and receives an instruction signal from the server, the server monitoring power demand of a load resource, and the instruction signal requesting power demand control of the load resource; a second communication circuit that communicates with a load resource via a second communication network; and a control circuit that executes one of a first mode and a second mode via the second communication network, the first mode controlling the power demand of the load resource according to a predetermined schedule, the second mode controlling the power demand of the load resource according to the instruction signal from the server, wherein in the case where the first communication circuit cannot communicate with the server via the first communication network when the control circuit is executing the second mode, the control circuit changes the second mode to the first mode.

With this, the control apparatus is capable of controlling the load resource in the first mode in the case where communication with the server becomes unavailable when controlling the load resource in the second mode. The instruction signal from the server is indispensable for the control apparatus to control the load resource in the second mode. However, the control apparatus is capable of controlling the load resource without the instruction signal from the server in the first mode. In another words, when communication becomes unavailable, the control apparatus is capable of continuing to perform control on the load resource by changing the mode so as to control the load resource without an instruction signal. Accordingly, the control apparatus is capable of properly controlling DR even when some troubles occur in the communication tools.

For example, in the case where the determining unit determines that the communication with the server is available when the control is being performed in the second mode, the control unit is configured to keep the second mode and perform the control.

With this, the control apparatus is capable of controlling the load resource while keeping the second mode when communication with the server is available. In general, the advantageous effect of stabilizing the system power supply is greater when controlling the load resource in the second mode than when controlling the load resource in the first mode, it is therefore desirable to select the second mode to control the load resource when the control apparatus is capable of controlling the load resource in either the first mode or the second mode. This is the reason why the control apparatus keeps the second mode in controlling the load resource as described above.

It is to be noted that a reward (incentive) a user can receive is greater when controlling the load resource in the second mode. Therefore, in such a case as described above, there is an advantageous effect of increasing the reward the user can receive, by selecting the second mode in controlling the load resource.

For example, the control on power demand includes at least one of start control which starts suppressing of the power demand and a restoration control which ends the suppressing of the power demand.

With this, the control apparatus is capable of starting or ending properly suppressing the power demand even when some troubles occur in the communication tools.

For example, even in the case where the determining unit determines that the communication with the server is unavailable when the control is being performed in the second mode, the control unit is configured to keep the second mode and perform the control on the load resource when a time at which a restoration signal is to be received can be estimated, the restoration signal being the instruction signal and indicating that the restoration control is to be performed.

With this, the control apparatus keeps control in the second mode even in the case where communication with the server becomes unavailable when performing control in the second mode. Then, it is possible to end the control on the power demand of the load resource (restoration) at the time estimated by the control unit. With this, it is possible to increase the opportunities to select the second mode which has a greater advantageous effect of stabilizing the system power supply, or make the duration of controlling in the second mode longer.

For example, the determining unit is configured to transmit, to the server, a confirmation signal for confirming availability of communication with the server, and determine that communication with the server is available when receiving a response signal transmitted by the server according to the confirmation signal.

With this, the communication unit is capable of determining availability of communication with the server with high accuracy, by actually performing communication using the confirmation signal and the response signal.

For example, the control apparatus further includes an obtaining unit configured to obtain, as the schedule, a schedule which is for performing the control in the first mode and includes a start time for starting suppressing of the power demand and a restoration time for ending the suppressing of the power demand, from the server prior to performing of the control.

With this, the control apparatus is capable of obtaining, from the server, a start time or an end time of suppressing power demand of the load resources when controlling in the first mode, and controlling based on the obtained time.

For example, the control unit is further configured to in the case where the determining unit determines that communication with the server is available after changing from the second mode to the first mode, ask the server whether or not a restoration signal which is the instruction signal has been transmitted by the server; and change the first mode to the second mode and perform the control when the restoration signal has already been transmitted by the server, and keep the first mode and perform the control when the restoration signal has not yet been transmitted by the server.

With this, the control apparatus is capable of taking a proper control status based on a control status in the server in the case where communication with the server is restored subsequent to a change in control from the second mode to the first mode due to unavailability of communication with the server.

For example, the control apparatus further includes a service selecting unit configured to select, based on an instruction from a user, one of a first power service with which the control apparatus performs the control according to a predetermined schedule and a second power service with which the control apparatus performs the control according to an instruction signal from the server, wherein the control unit is configured to perform the control in the first mode when the service selecting unit selects the first power service, and perform the control in the second mode when the service selecting unit selects the second power service.

With this, the control apparatus selects one of the first mode and the second mode to correspond with one of the first power service and the second power service which is selected by the user based on a contract with an aggregator. As a result, the mode selected by the control apparatus is based on the contract of the user. Thus, the control apparatus is capable of controlling the load resource in the first mode or the second mode based on the contract of the user with the aggregator.

For example, the first power service is peak cut supply in which the power demand of the load resource is suppressed during a predetermined period of time, and the second power service is one of (i) reserve supply in which the power demand of the load resource is suppressed with timing according to the instruction signal from the server, and (ii) frequency regulation in which the power demand of the load resource is suppressed with timing according to the instruction signal from the server based on a power demand value according to the instruction signal.

With this, the control apparatus is capable of controlling the load resource, properly switching the power services among the peak cut supply, the reserve supply, and the frequency regulation, based on availability of communication with the server.

For example, the load resource includes at least one of: a home appliance; an electric vehicle; a storage battery; a battery charger; a hot water heater; a refrigeration compressor; a dishwasher, a clothes dryer; an icemaker; and a swimming pool pump.

With this, the control apparatus is capable of controlling: the home appliance, the electric vehicle, the storage battery, the battery charger, the hot water heater, the refrigeration compressor, the dishwasher, the clothes dryer, the icemaker, and the swimming pool pump.

For example, when obtaining, from the server, at least one of a start time and an end time of suppressing the power demand in the second mode, the control unit is further configured to change the control to be performed in the first mode, and control the power demand of the load resource according to the at least one of a start time and an end time.

With this, the control apparatus is capable of controlling power demand of the load resource in the second mode according to the obtained start time or end time of the second mode.

In addition, a control method according to an aspect of the present invention is a control method performed by a control apparatus which is connected to a server via a network and performs control on power demand of a load resource, the control method including: determining whether or not communication between the server and the control apparatus is available; and executing one of a first mode and a second mode, the first mode being for controlling the power demand of the load resource according to a predetermined schedule, the second mode being for controlling the power demand of the load resource according to an instruction signal from the server, wherein, in the case where it is determined, in the determining, that the communication with the server is unavailable when the control is being performed in the second mode, the second mode is changed to the first mode and the control is performed.

With this, the advantageous effects same as those of the above-described control apparatus are produced.

In addition, a control method according to an aspect of the present invention is a control system including: the control apparatus and the server described above, wherein the determining unit of the control apparatus is configured to determine whether or not communication is available with the server.

With this, the advantageous effects same as those of the above-described control apparatus are produced.

These general and specific aspects may be implemented using a system, a method, an integrated circuit, a computer program, or a computer-readable recording medium such as a compact disc read only memory (CD-ROM), or any combination of systems, methods, integrated circuits, computer programs, or computer-readable recording media.

Hereinafter, certain exemplary embodiments are described in greater detail with reference to the accompanying Drawings.

It is to be noted that the exemplary embodiment described below shows a general or specific example. The numerical values, shapes, materials, structural elements, the arrangement and connection of the structural elements, steps, the processing order of the steps, and so on, shown in the following embodiment are mere examples, and therefore do not limit the present invention. In addition, among the structural elements in the following embodiments, structural elements not recited in any one of the independent claims are described as arbitrary structural elements.

Embodiment

In Embodiment, a demand response control system at the time of loss of communication between an aggregator and a DR controller will be described. In addition, an electrical energy system, an electrical load control system, and a method for managing and controlling an aggregated resource taking into consideration characteristics and constraints of the systems will be described.

Figure 1A:
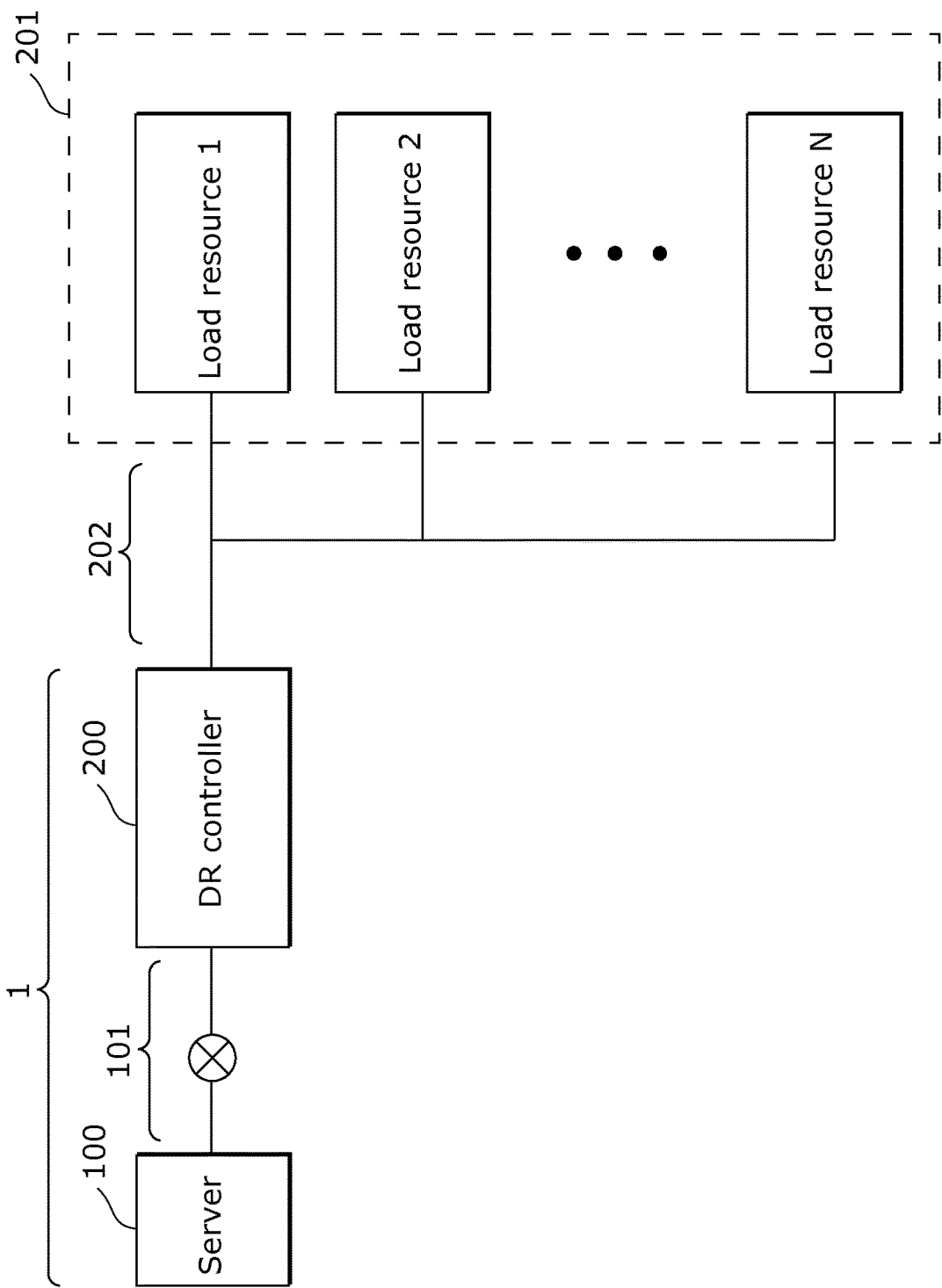
FIG. 1A is a configuration diagram of a control system according to Embodiment.

FIG. 1A is a configuration diagram of a control system 1 according to Embodiment. FIG. 1B is a diagram which illustrates a basic system configuration of a demand response service according to Embodiment. In Embodiment, the case including a server 100 and a DR controller 200 is considered. The server 100 may be a first operation determining system, and the DR controller 200 may be a second operation determining system. It is to be noted that the DR controller 200 corresponds to a control apparatus.

As illustrated in FIG. 1A and FIG. 1B, the control system 1 includes the server 100, the DR controller 200, and a load resource 201.

The server 100 is a server of the aggregator. The server 100 transmits an order (instruction signal) related to DR control, to the DR controller 200 via a communication 101.

The DR controller 200 controls an operation of a plurality of the load resources 201 in one premise. The DR controller 200 communicates with the server 100. The communication 101 transmits data 102 and an order 103 which are necessary for the DR operation. The DR controller 200 is capable of controlling the operation of the load resources 201. It is to be noted that the DR controller may be denoted by DRC.

The communicate 101 is implemented by, for example, a wired or wireless network, power line communication (PLC), and so on.

The load resource (LR) 201 is, for example, a home appliance (HA), an electric vehicle, a storage battery, a battery charger, a hot water heater, a refrigeration compressor, a dishwasher, a clothes dryer, an icemaker, a swimming pool pump, and so on.

Examples of the order 103 include an activation time, a restoration time, a demand increase amount or a demand decrease amount, and so on. As examples of the data 102, a DR contract, a DR schedule or a DR incentive price, and so on are available. Using the data and the order described above, the DR controller 200 is capable of controlling the load resource 201 and providing a DR service 203.

Figure 2:
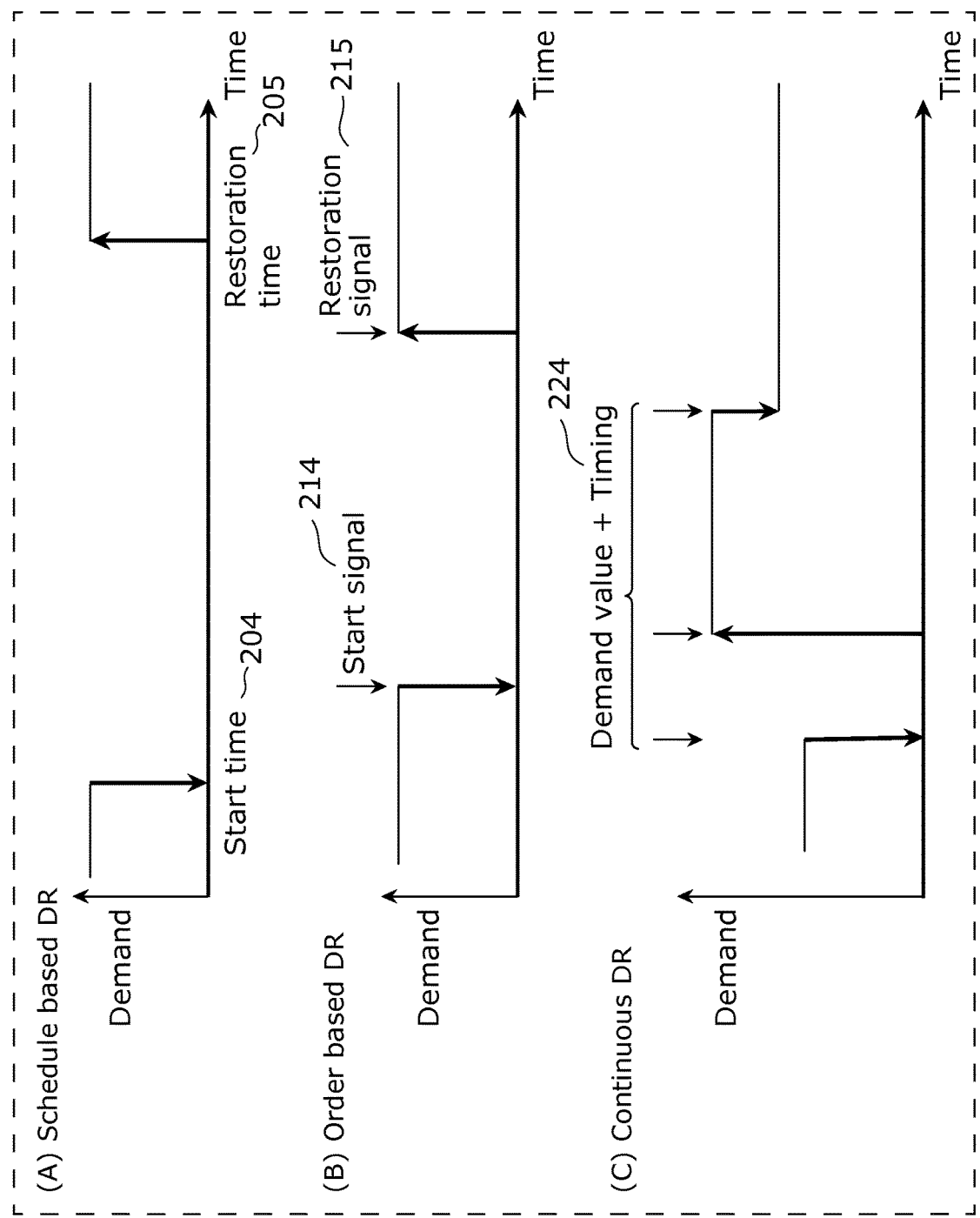
FIG. 2 is a diagram which illustrates DR classification based on a communication request, according to Embodiment.

FIG. 2 is a diagram which illustrates DR classification based on a communication request, according to Embodiment. FIG. 2 is a diagram which indicates that the DR is classified into any one of types including at least three types of (1) schedule based DR, (2) order based DR, and (3) continuous DR. This classification is based on a communication request.

According to the "schedule based DR" type, a load amount to be reduced/increased (in other words, power demand amount), a start time 204 and a restoration time 205 are previously notified to the DR controller 200. Start control for starting suppressing of power demand is performed at the start time 204, and Restoration control for ending the suppressing of power demand is performed at the restoration time 205. The start control and the restoration control are collectively referred to as control. An example of this type of DR includes "peak cut supply" or "negawatt". It is to be noted that the "schedule based DR" may also be referred to as a DR of type 1.

According to the type of the "order based DR", the load increase amount/load decrease amount data or the start time and restoration time data are not previously known. Such data items are transmitted to the DR controller 200 via the communication 101 within a DR operation period using the order (also referred to as an instruction signal). Then, the start control for starting suppressing of power demand is carried out when the start signal which is one example of the instruction signal is received, and the restoration control for ending the suppressing of power demand is carried out when the restoration signal which is another example of the instruction signal is received. According to this type, other orders are not required between the start and the restoration. An example of this type of DR is "reserve supply". It is to be noted that the "order based DR" may also be referred to as a DR of type 2.

According to the type of the "continuous DR", the load increase amount/load decrease amount data and timing data are transmitted to the DR controller 200 via the communication 101 within the DR operation period. An example of this type is the "frequency regulation (FR)". It is to be noted that the "continuous DR" may also be referred to as a DR of type 3.

It is to be noted that the type 1 corresponds to the first mode. In addition, each of the type 2 and the type 3 corresponds to the second mode.

It is to be noted that, in general, a user can obtain a higher reward (incentive) when the order based DR is carried out than when the schedule based DR (type 1) is carried out. Likewise, the incentive is higher when the continuous DR is carried out than when the order based DR is carried out.

It is to be noted that FIG. 2 is merely an explanatory diagram, and thus does not limit the DR types and the number of DR in the present invention.

(Concept of DR Type Change)

Based on communication requests, various "DR types" are present. When communication between the server 100 and the DR controller 200 fails, the main purpose of the DR controller 200 is to keep the original DR schedule and to continue the DR control of the type received from the server 100. However, due to unavailability of communication, a certain type of DR cannot be continued in some cases. In such a case, the DR controller 200 changes the DR type according to the circumstance, without running contrary to any requests.

Figure 3:
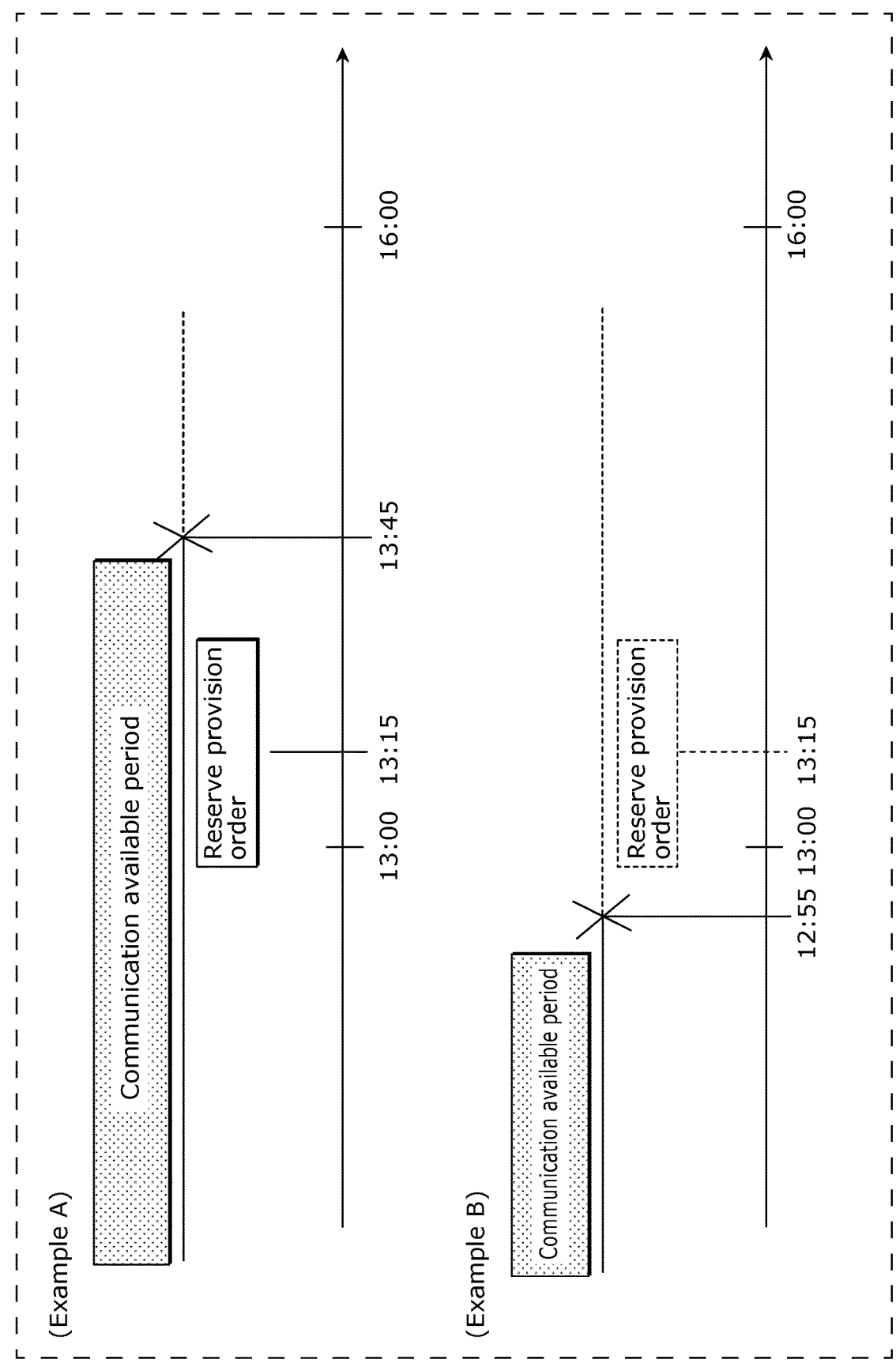
FIG. 3 is an example of loss of communication timing on DR type operation in an independent operation mode, according to Embodiment.

The following recites examples for easier understanding of the concept according to Embodiment. FIG. 3 is an example of loss of communication timing on performing of the DR type operation in an independent operation mode, according to Embodiment.

Example A

1. The DR controller 200 was designed to perform the reserve supply (original DR schedule) between 13:00 and 16:00.
2. The DR controller 200 received a reserve provision signal at 13:15.
3. The DR controller 200 started the DR operation at 13:15.
4. Communication between the DR controller 200 and the server 100 became unavailable at 13:45.
5. The DR controller 200 has not yet received a reserve restoration instruction.
6. The server 100 has transmitted reserve supply period information to the DR controller 200 prior to 13:00.

In this example, since the reserve supply period is previously provided, the DR controller 200 continues the "reserve supply" until the supply period expires. While performing the DR control, the DR controller 200 checks whether or not the communication is restored, and operates as ordered by the server 100 when the communication is restored.

Example B

The following circumstance will be considered.
1. The DR controller 200 was designed to perform the reserve supply (original DR schedule) between 13:00 and 16:00 (peak time).
2. Communication 101 between the DR controller 200 and the server 100 became unavailable at 12:55.
3. The DR controller 200 is capable of performing the "peak cut" from 13:00 to 14:00, based on a market rule, an aggregator contract, a DR controller 200 contract, and the load resource 201. It is to be noted that, in the description below, the term "DR controller 200 contract" means a DR contract between the server 100 and a user who is qualified to control the DR controller 200 and the load resource 201.

Since the communication 101 became unavailable prior to a "provision order", the DR controller 200 cannot perform the "reserve supply". The reason for this is because the DR controller 200 cannot figure out when to start load reduction. At this time, the DR controller 200 is capable of determining to "change the DR type" from the "reserve supply" (original DR plan) to the "peak cut supply". This is financially beneficial to both of the user and the aggregator, compared to the case where any DR is not carried out.

(Block Diagram and Internal Processing)

Figure 4:
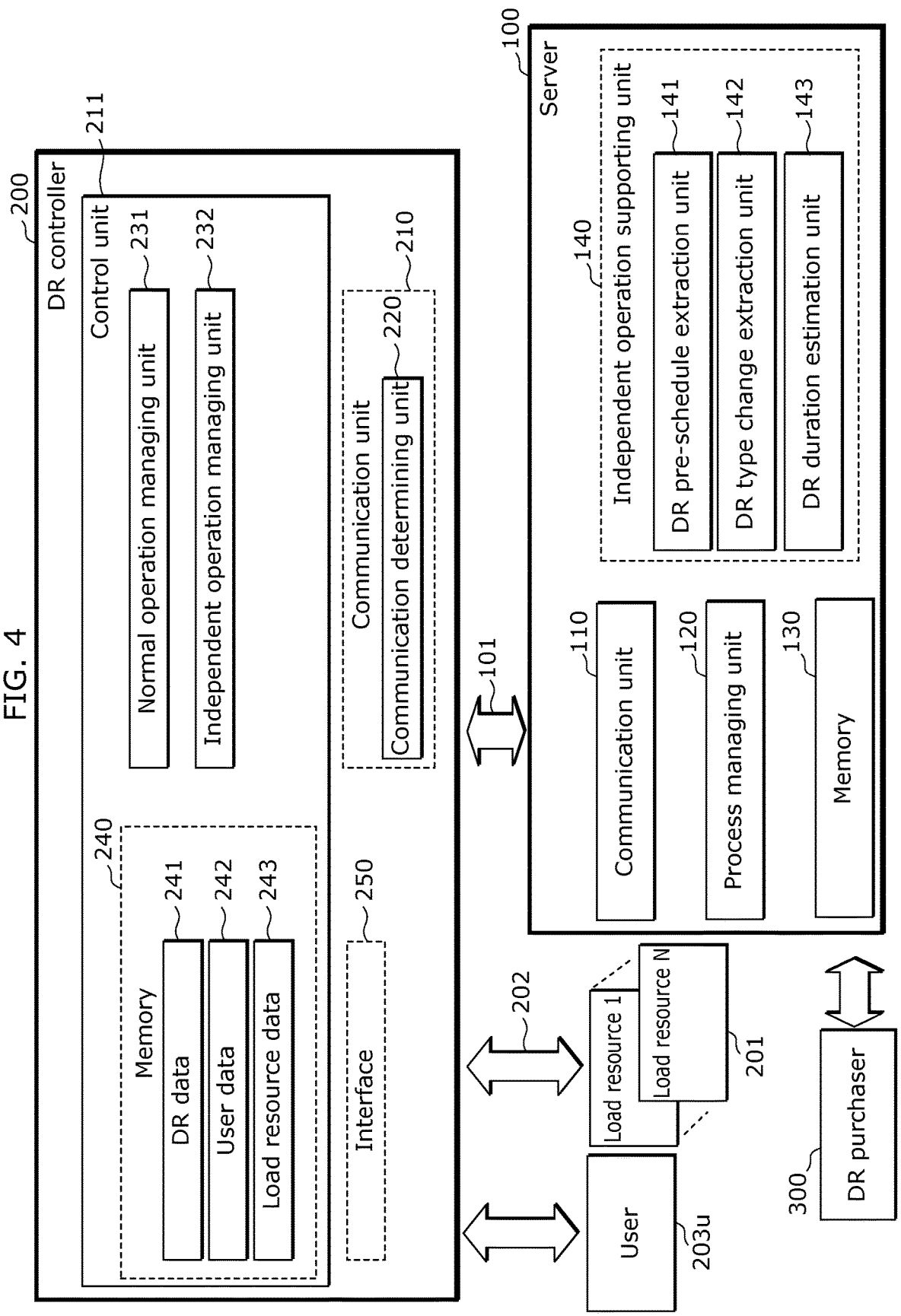
FIG. 4 is block diagram of the server and the DR controller according to Embodiment.

FIG. 4 is a block diagram of the server and the DR controller according to Embodiment. The DR controller 200 includes a communication unit 210 and a control unit 211 according to Embodiment. The communication unit 210 includes a communication determining unit 220. The control unit 211 includes: a normal operation managing unit 231; an independent operation managing unit 232; and a memory 240. In addition, the DR controller 200 may further include an interface 250.

The communication unit 210 is in charge of the communication 101 and communication 202 between the DR controller 200 and the load resource 201.

The communication determining unit 220 determines whether or not the server 100 and the DR controller 200 can communicate with each other. It is to be noted that the communication determining unit 220 corresponds to a determining unit. The communication determining unit 220 transmits, to the server 100, a confirmation signal for confirming availability of communication with the server 100, and determines that communication with the server 100 is available when receiving a response signal which is transmitted from the server 100 in response to the confirmation signal.

The control unit 211 executes one of operation modes of (i) a first mode for controlling power demand of the load resource 201 according to a predetermined schedule and (ii) a second mode for controlling power demand of the load resource according to the instruction signal from the server 100. In addition, in the case where the communication determining unit 220 determines that the communication with the server 100 is unavailable when performing control in the second mode, the control unit 211 switches the operation mode into the first mode and carries out control. In addition, in the case where the communication determining unit 220 determines that the communication with the server 100 is available when performing control in the second mode, the control unit 211 keeps the second mode and carries out control.

In sum, the normal operation managing unit 231 handles the DR operation when the communication 101 succeeds. On the other hand, the independent operation managing unit 232 handles the DR operation when the communication 101 fails.

It is to be noted that the DR controller 200 may include an obtaining unit (not illustrated) which obtains, from the server 100, a schedule which is a schedule in the case of performing control in the first mode and includes (i) a start time for starting suppressing of power demand and a restoration time for ending the suppressing of power demand, prior to performing the control.

In addition, even in the case where the communication determining unit 220 determines that communication with the server 100 is unavailable when performing control in the second mode, the load resource 201 may be controlled with the second mode being kept when a time at which the restoration signal which is an instruction signal and indicates that a restoration control is to be performed is to be received can be estimated.

In addition, in the case where the communication determining unit determines that communication with the server 100 is available subsequent to switching from the second mode to the first mode, whether or not the restoration signal that is one example of the instruction signal has been transmitted by the server 100 may be inquired, and control may be carried out by switching the operation mode into the second mode when the server 100 has already transmitted the restoration signal, and control may be carried out by keeping the first mode when the server 100 has not yet transmitted the restoration signal.

In addition, the control unit 211, when at least one of the start time and the end time of suppressing of power demand in the second mode is obtained from the server 100, the control unit 211 may further switch control such that the control is performed in the first mode, and control power demand of the load resource according to at least one of the start time and the end time.

It is to be noted that the DR controller 200 may further include a service selecting unit (not illustrated) which selects, based on an instruction from a user, one of (i) a first power service of performing control according to a predetermined schedule and (ii) a second power service of performing control according to an instruction signal from the server 100, and the control unit 211 may perform control in the first mode when the service selecting unit selects the first power service and may perform control in the second mode when the service selecting unit selects the second power service.

The memory 240 includes DR data 241, user data 242, and load resource data 243.

The interface 250 is an interface which receives an input operation from a user 203u.

FIG. 4 illustrates internal blocks of the server 100. The server 100 provides a DR service to a single/plural DR purchaser 300. In addition, the DR purchaser 300 may also be the same as the aggregator (server 100).

As illustrated in FIG. 4, the server 100 includes: a communication unit 110; a process managing unit 120; a memory 130; and an independent operation supporting unit 140.

The communication unit 110 serves a roll of transmitting and receiving data and transmission of DR order/signal to each of DR controllers 200.

The process managing unit 120 is in charge of operation and handling of the DR aggregation.

The memory 130 stores, for example, DR data, user data, or load resource data.

The DR data is data including, for example, DR contracts, previous DR performance, how a load resource is to be assigned to a different DR.

The user data is data including, for example, a user set point for a load resource, a user DR setting, a user DR performance data, and so on.

The load resource data is data including, for example, context data of a load resource, a remaining amount of energy, a temperature, an operation point, and so on.

The independent operation supporting unit 140 generates supplementary data for allowing the DR controller 200 to operate in an independent operation mode when the communication 101 fails. The independent operation supporting unit 140 includes, specifically, a DR pre-schedule extraction unit 141, a DR type change extraction unit 142, and a DR duration estimation unit 143.

The DR pre-schedule extraction unit 141 previously estimates a DR schedule for a resource of the "schedule based DR". This data is generated based on market information, DRC information, and aggregator information. The "pre-schedule" means simply estimating an actual DR schedule which will be performed by the DR controller 200 in the case where the communication 101 fails. When the communication state is normal, the "pre-schedule" is not used.

The DR type change extraction unit 142 generates a "DR type change table of aggregator".

The DR duration estimation unit 143 extracts a result of estimating a period of duration of a DR operation of each type.

According to another embodiment of the present system, system data of the DR pre-schedule extraction unit 141, the DR type change extraction unit 142, and the DR duration estimation unit 143 are periodically updated, and transmitted to the DR controller 200 prior to an actual operation time.

According to another embodiment of the present system, the server 100 uploads, to the DR controller 200, source code, software, database, and so on, such that the DR controller 200 can calculate such data independently when operating in the independent operation mode. The server 100 updates the source code, the software, and the database when necessary.

Figure 5:
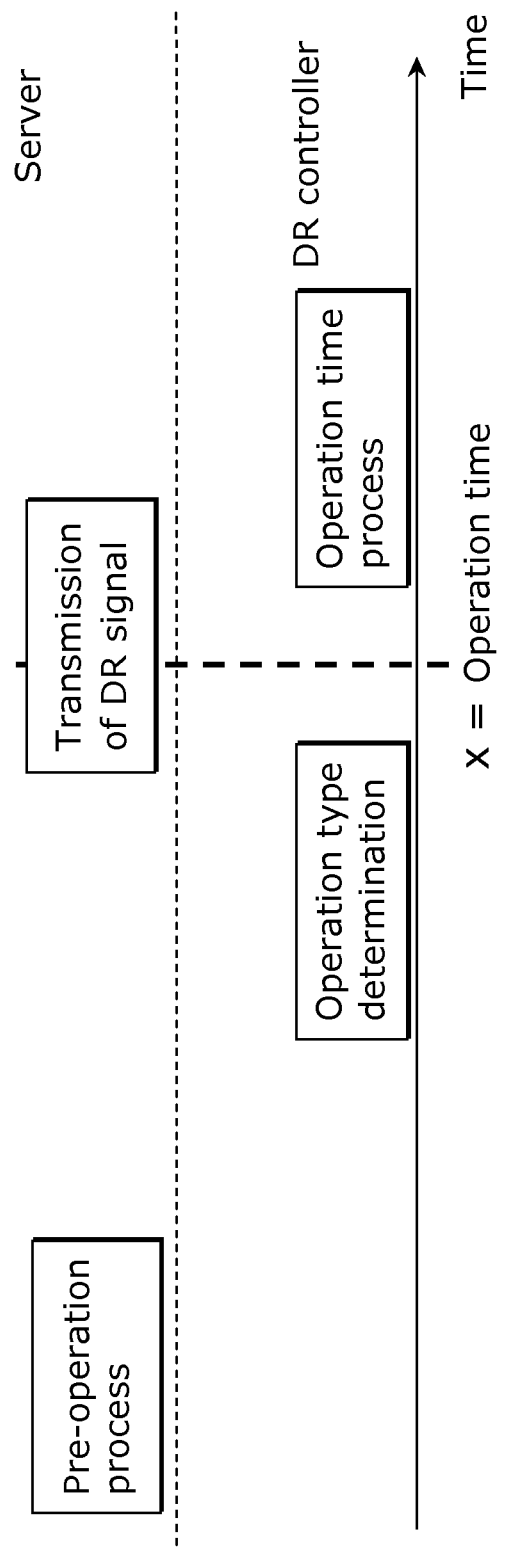
FIG. 5 is a diagram which illustrates a necessary operation for enabling the independent operation of the DR controller, performed by the aggregator and the DR controller in different time steps, according to Embodiment.

FIG. 5 is a diagram which illustrates a necessary operation for enabling the independent operation of the DR controller, performed by the aggregator and the DR controller in different time steps, according to Embodiment. FIG. 5 illustrates a time sequence diagram of a necessary operation in an example according to Embodiment, for facilitating understanding.

FIG. 6A is a sequence diagram of a pre-operation process according to Embodiment. FIG. 6A illustrates a sequence diagram of such operations as below which are carried out by the server 100 of the aggregator prior to the operation time.

The server 100 generates data items useful to the DRC in the independent operation mode (Step S601).

The DR type change permission table of the server (aggregator) is a table which defines a DR type which the server permits change. This will be described later in detail.

The pre-schedule for each DR type is a pre-schedule for DR in each of the DR types 1 to 3. More specifically, DR of the type 1 is a schedule indicating a predetermined period of time during which power demand is to be reduced. In addition, DR of the type 2 or the type 3 is a schedule indicating a period of time during which control of power demand is possible by receiving an instruction signal from the server. It is to be noted that a pre-schedule for each DR type is also referred to as a prediction period for a DR type in some cases. This is because the period is a period in which DR of each DR type is predicted to be performed.

The threshold of communication loss duration is a threshold used when switching from the normal operation mode to the independent operation mode, and will be described in detail later.

The server 100 transmits the data generated in Step S601 to the DR controller (Step S602).

Figure 6B:
FIG. 6B illustrates an example of a DR type change permission table of the server according to Embodiment.

FIG. 6B illustrates an example of a DR type change permission table of the server according to Embodiment.

In FIG. 6B, "Y" indicates a DR type which is allowed, by the server, to be selected after change, for each of the DR types (types 1, 2, and 3) selected before the change. In addition, DR types other than those stated above are each denoted by "N". According to FIG. 6B, for example, when the DR type is type 1 before change, it is possible to change the DR type to type 1 or 2. However, it is not possible to change the DR type to type 3. It is to be noted that, in the above description, the expression "change" is used also in the case where the DR type before change is the same as the DR type after change, and this means that the DR type is to be kept. In other words, the description of "to change from DR type 1 to DR type 1" means "to keep DR type 1".

FIG. 7 is a flowchart illustrating a pre-operation process by the server according to Embodiment. FIG. 7 illustrates a flowchart of an operation performed by the server 100 prior to an operation time.

The server 100 obtains DR controller 200 data, aggregator portfolio data, aggregator contract data, market data, and communication performance data (Step S701).

The server 100 analyzes an arbitrary combination of data items obtained in Step S701 (Step S702), and generates an arbitrary combination of data times described below (Step S703).

1. "DR type permission of aggregator" data which allows the DR controller 200 to understand what DR type change meets the condition of the server 100 of the aggregator.

For example, determination of the server 100 is considered in the case where there are conditions that (1) the server 100 has a contract to sell both the "peak cut supply" and the "reserve supply" to a system operator, and (2) peak cut more than the amount that has been bid can be performed based on the market rule.

When both of the above-described (1) and (2) are satisfied, the server 100 allows the DR controller 200 to change from the "reserve supply" to the "peak cut supply" when the communication 101 fails. On the other hand, when either one of the condition (1) and the condition (2) is not satisfied, the server 100 cannot accept the DR type change of the "peak cut supply" and the "reserve supply". The "DR type change permission of aggregator" is previously transmitted to the DR controller 200 through the communication 101.

2. Pre-schedule for each DR type

3. "Communication loss duration" for shifting the DR controller 200 from the normal operation mode to the independent operation mode According to Embodiment, the above-described data may be probabilistic/fuzzy and will be transferred to the DR controller 200. The DR controller 200 determines a final value. According to Embodiment, the server 100 determines the final value of the above-described data item, and transfers the value to the DR controller 200 (Step S704).

According to another embodiment of the present invention, the server 100 updates function/software of the DR controller 200 which calculates such data.

Figure 9:
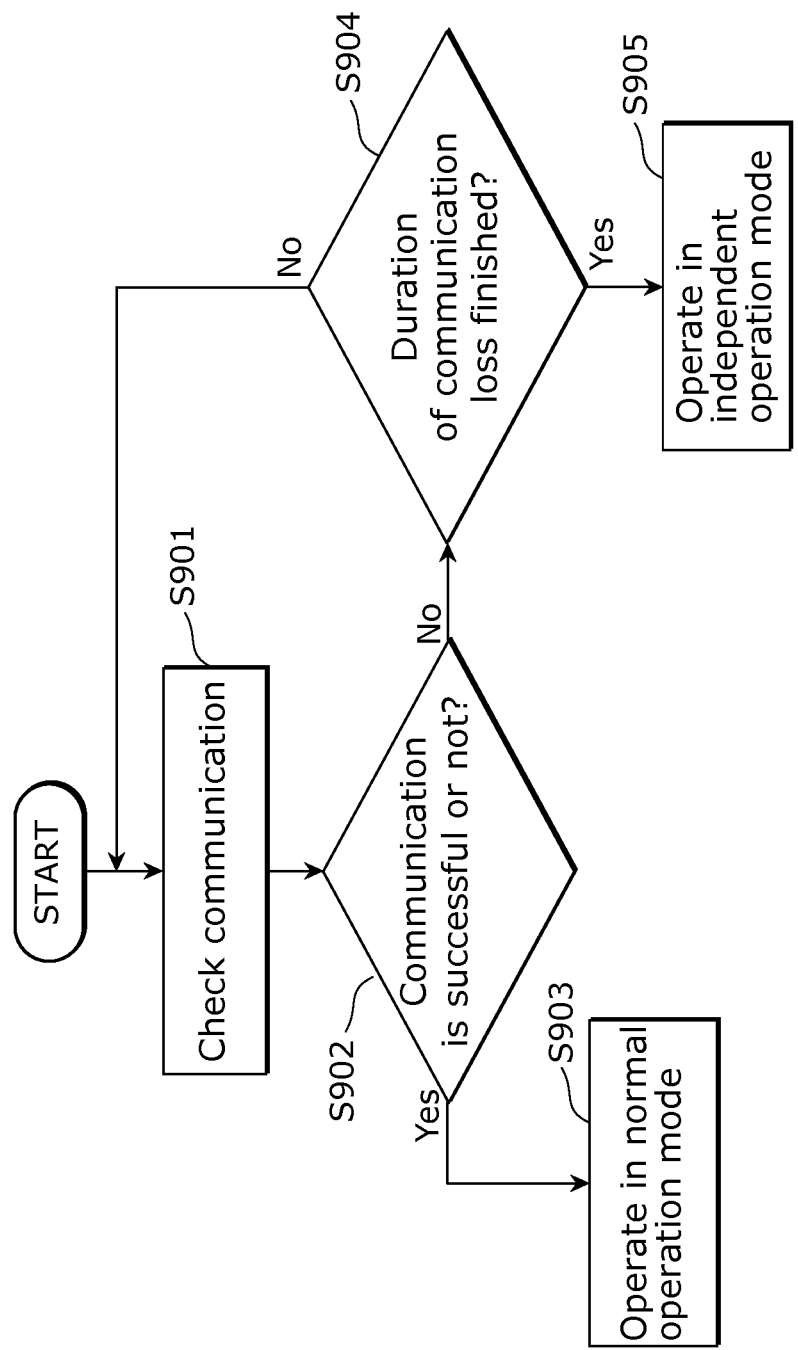
FIG. 9 is a flowchart of selecting an operation type performed by the DR controller in an operation time, according to Embodiment.

FIG. 8 is a sequence diagram of selecting an operation type performed by the DR controller 200 in an operation time, according to Embodiment. FIG. 9 is a flowchart of selecting an operation type performed by the DR controller in an operation time, according to Embodiment.

First, the server 100 transmits a DR order to the DR controller 200, and the DR controller 200 checks the communication state (Step S901).

Then, the communication determining unit 220 determines whether or not the communication 101 succeeds (Step S902).

When the communication 101 succeeds (Yes in Step S902), the normal operation managing unit 231 performs a normal operation (Step S903). When the communication 101 fails (No in Step S902), a specific period for shifting to the independent operation mode; that is, a threshold of communication loss duration for shifting to the independent operation mode ((D) in Step S601) is checked by the DR controller 200. When the communication 101 fails to the end of the threshold of communication loss duration ((D) in Step S601), the independent operation managing unit 232 performs operation in the independent operation mode (Step S905).

Figure 10:
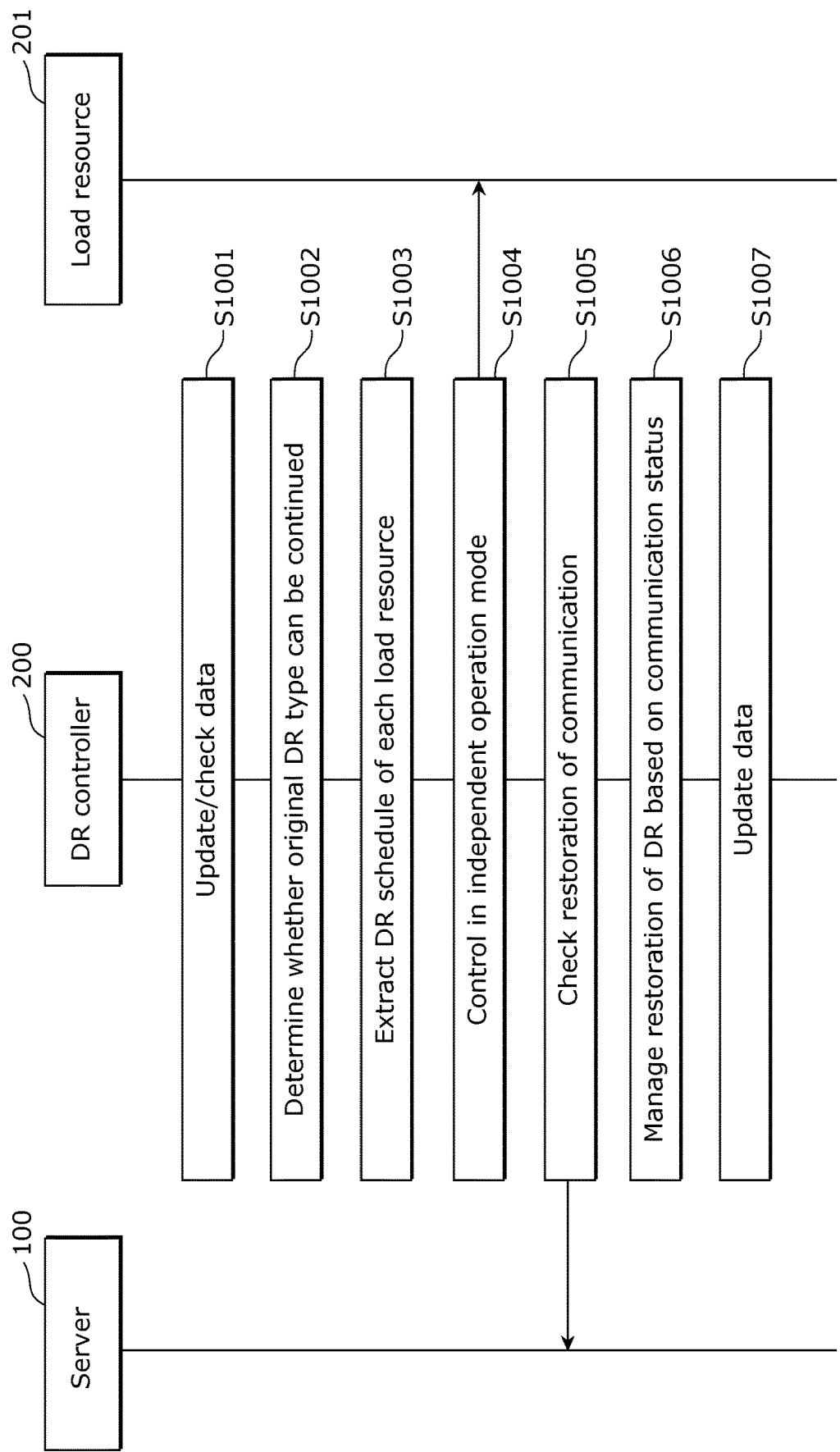
FIG. 10 is a sequence diagram of an operation time process performed by the DR controller in the independent operation mode when an original DR type can be continued, according to Embodiment.
Figure 12:
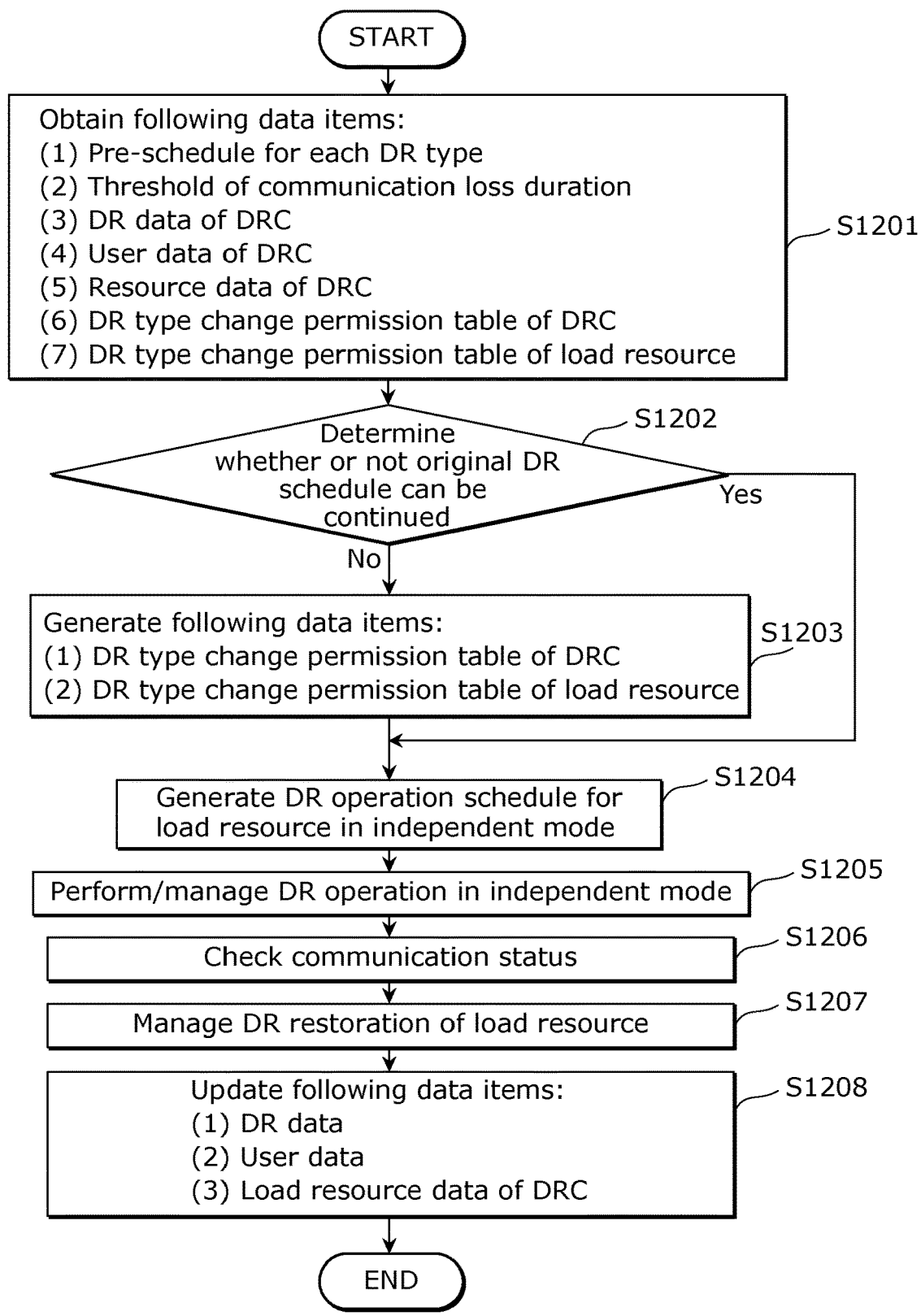
FIG. 12 is a flowchart of managing the independent DR operation performed by the DR controller according to Embodiment.

FIG. 10 is a sequence diagram of an operation time process performed by the DR controller in the independent operation mode when an original DR schedule can be continued, according to Embodiment. FIG. 11A is a sequence diagram of an operation time process performed by the DR controller in the independent operation mode, according to Embodiment. FIG. 12 is a flowchart of managing the independent DR operation performed by the DR controller according to Embodiment. The sequence diagrams illustrated in FIG. 10 and FIG. 11 are implemented by performing the operation according to the flowchart illustrated in FIG. 12.

The DR controller 200 checks the DR data 241, the user data 242, the load resource data 243, and so on which are items of updated data including the data provided by the server 100 in Step S602 (FIG. 6A) for supporting the independent operation (Step S1001 and Step S1201).

The DR controller determines whether or not to change the DR type (Step S1002 and Step S1202). When there are sufficient support data items (data outputted in Step S601) for operating a DR event without communication, the DR controller determines not to change the DR type.

When the DR controller determines not to change the DR type, the DR controller sets a schedule for a DR operation of each of the load resources (Step S1003 and Step S1204). Here, for example, the DR controller determines an end time of the DR based on a "prediction DR period" provided by the server 100 as illustrated in Example A in FIG. 3.

The DR controller manages DR operations based on the independent operation schedule (output of Step S1003) (Step S1004 and Step S1205).

At the same time, the DR controller determines whether or not communication is available (Step S1005 and Step S1206).

The DR controller 200 manages restoration of DR based on availability of communication checked in Step S1005 and the schedule which has been set in Step S1003 (Step S1006 and Step S1207).

The DR controller 200 updates the DR data 241, the user data 242, and the load resource data 243 (Step S1007 and Step S1208).

It is to be noted that, in this case, the data provided from the server 100 for supporting the DR controller 200 in operation allows the DR controller 200 to keep the DR performance which is very close to the original DR schedule.

The following describes, with reference to FIG. 11A, an independent operation mode in the case where change in the DR type cannot be avoided.

The DR controller 200 checks the DR data 241, the user data 242, and the load resource data 243, which are items of updated data including the data provided by the server 100 in Step S601 for supporting the independent operation (Step S1001 and Step S1201).

The DR controller 200 determines whether or not to change the DR type, in other words, whether or not the original DR type can be continued (Step S1002 and Step S1202). When there are not sufficient support data items (data outputted in Step S601) for operating a DR event without communication, the DR controller 200 determines to change the DR type.

The DR controller 200 generates a "DR type change permission table of DRC" based on the DR data 241, the user data 242, and the load resource data 243 (Step S1101 and Step S1203). The DR type change permission table of DRC indicates what type of DR type change is possible for the DR controller 200.

The DR controller 200 generates a "DR type change permission table of a load resource" for each of the available load resources based on the "DR type change permission table of DRC" generated in Step S1101, the DR data 241, the user data 242, and the load resource data 243 (Step S1102 and Step S1203). The "DR type change permission table of the load resource" indicates what type of DR type change is possible for each of the load resources.

The DR controller 200 determines a DR schedule for each of the load resources based on the "DR type change permission table of DRC" generated in Step S1101, the "DR type change permission table of the load resource" generated in Step S1102, the DR data 241, the user data 242, and the load resource data 243 (Step S1103 and Step S1204).

Subsequent to starting operation of the DR resource (load resource) based on the schedule determined in Step S1103 (Step S1104), the DR controller 200 manages the operation (Step S1105 and Step S1205).

The DR controller 200 checks whether or not communication is available (Step S1006 and Step S1206).

The DR controller 200 manages restoration of each of the load resources in consideration of the results of the output of Step S1104, the output of Step S1102, the DR data 241, the user data 242, and the load resource data 243 (Step S1107 and Step S1207).

The DR controller 200 updates the DR data 241, the user data 242, and the load resource data 243 (Step S1108 and Step S1208).

FIG. 11B illustrates an example of a DR type change permission table of a DR controller according to Embodiment.

In FIG. 11B, a DR type which is permitted by the DR controller to be selected after change is denoted by "Y", for each of the DR types (types 1, 2, and 3) selected before change. In addition, DR types other than those stated above are each denoted by "N", FIG. 11B differs from FIG. 6B in that, whereas the subject which issues permission is the server in FIG. 6B, the subject issues permission is the DR controller in FIG. 11B.

FIG. 11C illustrates an example of a DR type change permission table of the load resource according to Embodiment.

In FIG. 11C, a DR type which is permitted by the load resource to be selected after change is denoted by "Y", for each of the DR types (types 1, 2, and 3) selected before the change. In addition, DR types other than those stated above are each denoted by "N". FIG. 11C differs from FIG. 6B in that, whereas the subject of control is all of the load resources controlled by a single DR controller in FIG. 6B, the subject is one load resource in FIG. 11C.

Figure 13:
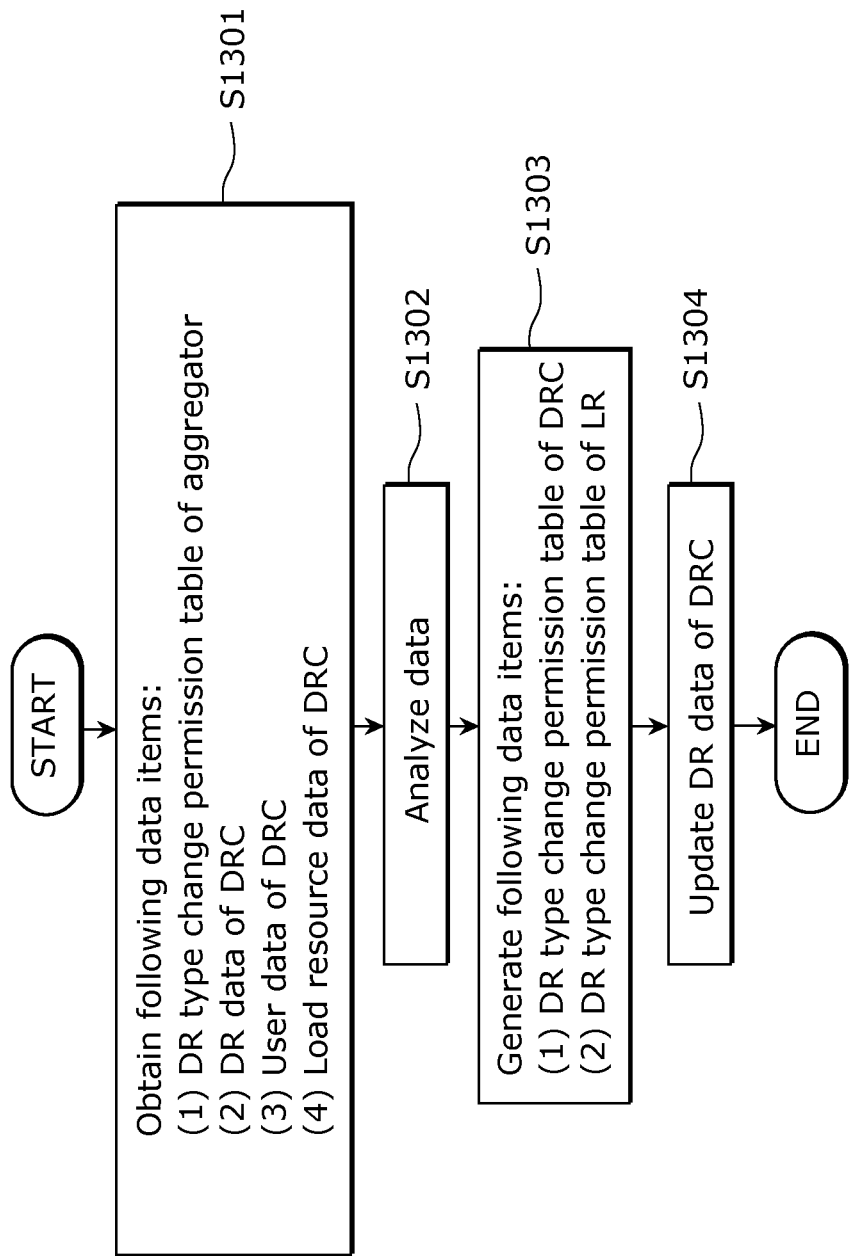
FIG. 13 is a flowchart related to generation of the DR type change permission table according to Embodiment.

FIG. 13 is a flowchart related to generation of the DR type change permission table according to Embodiment. More specifically, FIG. 13 is a diagram which illustrates the processes performed by the DR controller 200 to generate the "DR type change permission table of DRC" and the "DR type change permission table of the load resource".

The DR controller 200 obtains data items including: a DR type of aggregator; DR data including a contract type of a contract between the DR controller and the server 100; user data and load resource 201 data of the DR controller 200; and so on (Step S1301).

The DR controller 200 analyzes the data obtained in Step S1301 (Step S1302).

The DR controller 200 generates a DR type change permission table of a DR controller and a DR type change permission table of each of the load resources (Step S1303). In this step, change in DR type from type X to type Y should not violate any of the DR contracts available in the DR data 241 and should not ignore user setting available in the user data 242, and should not disrupt each function of the load resources available in the load resource data 243.

The DR controller 200, upon generating the above-described table in Step S1303, a new DR type change permission for the DR controller and each of the load resources are updated in the DR data 241 (Step S1304). For example, when a user of the DR controller 200 does not have a contract of the "peak cut supply" with the aggregator, the DR controller 200 cannot accept change in the DR type from the "reserve supply" to the "peak cut supply". The reason for this is that the user of the DR controller 200 cannot receive any incentive for that.

In Step S1102, the "DR type change permission table of the load resource" is controlled by the DR controller 200 and generated for each of the load resources 201. According to Embodiment, the "DR type change permission table of the load resource" defines a DR type change permission for each of the load resources 201. For example, the "DR type change permission of the load resource" is generated using context data of each of the load resources, history performance data, user settings, and contract context of each DR.

The following describes an example.

1. DRC can accept, from 13:00 to 14:00, data of the "DR type change permission table of DRC" for changing from the "reserve supply" to the "peak cut supply".

2. In addition, an air conditioning device (load resource 1) can accept the change in DR type from the "reserve supply" to the "peak cut supply".

3. A battery (load resource n) is restricted according to a state of charge (SOC), and thus cannot perform the peak cut from 13:00 to 14:00.

In this case, the "DR type change permission of the load resource" for changing from the "reserve supply" to the "peak cut supply" is not issued to the load resource n.

Figure 14:
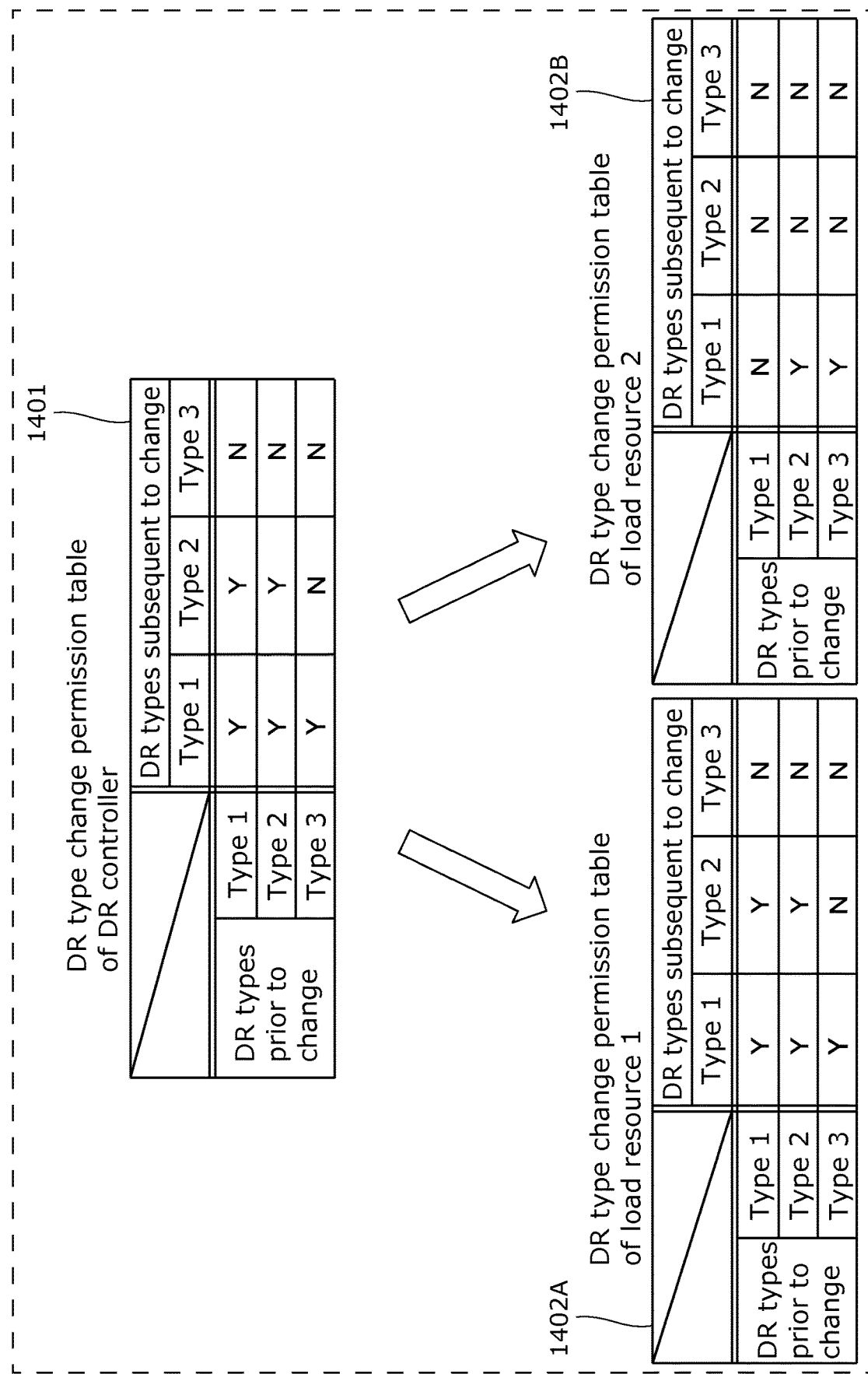
FIG. 14 is an explanation diagram of the "DR type change permission table" for the DR controller and each of the load resources, according to Embodiment.

FIG. 14 is an explanation diagram of the "DR type change permission table" for the DR controller and each of the load resources, according to Embodiment. FIG. 14 illustrates a conceptual example of a DR type change permission table of DRC 1401, a DR type change permission tables of load resources 1402A and 1402B according to Embodiment. It is to be noted that the "DR type change permission table of a load resource" may be different for each of the load resources. It is assumed, for example, that a load resource 1 (battery or the like) is capable of executing a schedule based DR (type 1), an order based DR (type 2), and a continuous DR (type 3). In addition, the load resource N (an air conditioning device which cannot perform the peak cut due to user setting that does not allow long duration restriction, or the like) cannot provide a schedule based DR or a continuous DR. Here, each "DR type change permission table of a load resource" is a sub function of the "DR type change permission table of a DR controller".

According to another embodiment, capacity of each load resource which can change the DR type is defined on the DR type change table of a load resource.

Figure 15:
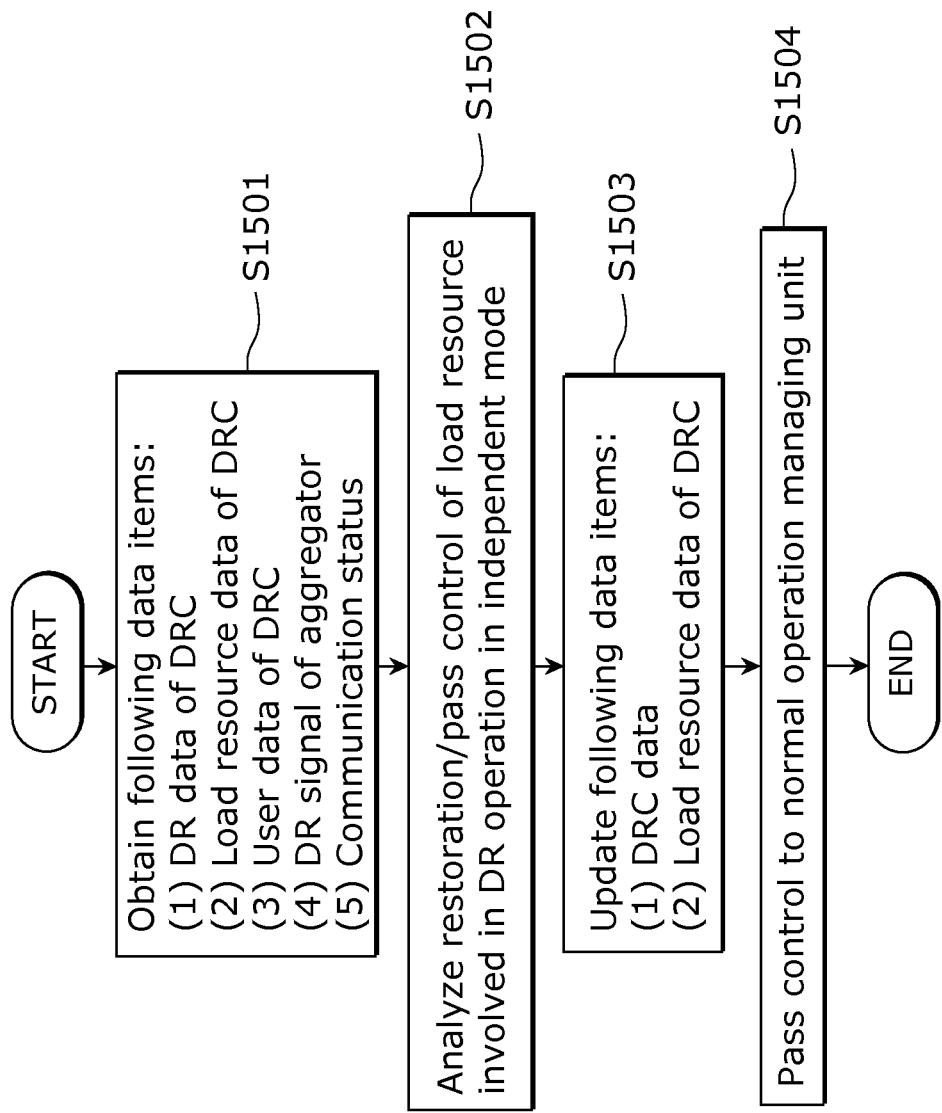
FIG. 15 is a flowchart of managing the independent DR operation at the time of communication restoration according to Embodiment.

FIG. 15 is a flowchart of managing the independent DR operation at the time of communication restoration according to Embodiment. FIG. 15 illustrates the processes of determining operation when the communication 101 returns to a normal state. There is a case where the load resource 201 is involved in a DR operation different from the original DR ordered by the server 100. This happens due to DR type change or using the pre-schedule and/or estimated DR duration data rather than the actual DR order. Restoration and/or passing of control to the normal operation management should be handled in the independent operation managing unit 232. According to Embodiment, the independent operation managing unit 232 obtains an arbitrary combination of data items described below (Step S1501).

The DR data 241

The user data 242

The load resource data 243

An actual DR schedule performed by the DR controller 200

An original DR type scheduled by the server 100 order conditions and a time sequence of the original DR schedule Communication restoration timing After analyzing such data items, restoration is determined and carried out (Step S1502). Then, the data state of the DR data 241 and the load resource data 243 are updated (Step S1503). Subsequently, authority for control is passed to the normal operation managing unit 231 (Step S1504), and restoration of the load resource 201 and/or how to pass the control to the normal operation managing unit 231 is managed.

An example is provided below for facilitating understanding.

For example, the following conditions are assumed.

1. The load resource 1 was originally planed to perform reserve supply from 13:00 to 14:00.

2. Communication became unavailable at 12:55, and thus the DR type was changed to "peak cut supply".

3. Due to "peak cut supply" conditions, the DR duration should continue for at least 30 minutes. If restored immediately, there is a possibility that it does not meet the conditions as a DR operation. (In other words, if the peak cut supply starts at 13:00, it needs to continue until 13:30. Otherwise this "peak cut operation" does not meet the conditions.)

4. The communication is restored at 13:20.

5. The original DR schedule of the server 100 was the reserve supply. The server 100 transmitted a "provision signal" of the reserve supply at 13:10. However, since the communication between the server 100 and the DR controller 200 was unavailable, the DR controller 200 was not able to receive the above-described provision signal.

Considering the above-described conditions, if the load resource 1 is restored at 13:20, the "peak cut" operation does not meet the conditions of the DRC. In addition, the reserve supply has already been provided, and the load resource 1 can no longer participate in DR of the reserve supply. Thus, the independent operation managing unit 232 determines to keep the load resource 1 in the "peak cut operation" state until 13:30. The independent operation managing unit 232 updates the DR type, the restoration time, and controllability in the DRC database. Then the independent operation managing unit 232 passes the control of the other load resources to the normal operation managing unit 231. The normal operation managing unit 231 checks the updated data and restores the load resource 1 at a specified time.

More specifically, the normal operation managing unit 231 minimizes the costs and the penalty for restoring operation when the communication is restored. However, the original DR order from the server is given priority except for the case where DR contract information or appliance context data prevents operation according to the original DR order.

The following describes control of power demand of the load resource performed by the DR controller in various cases of communication state between the server and the DR controller, and transmission timing of an order signal.

Figure 16:
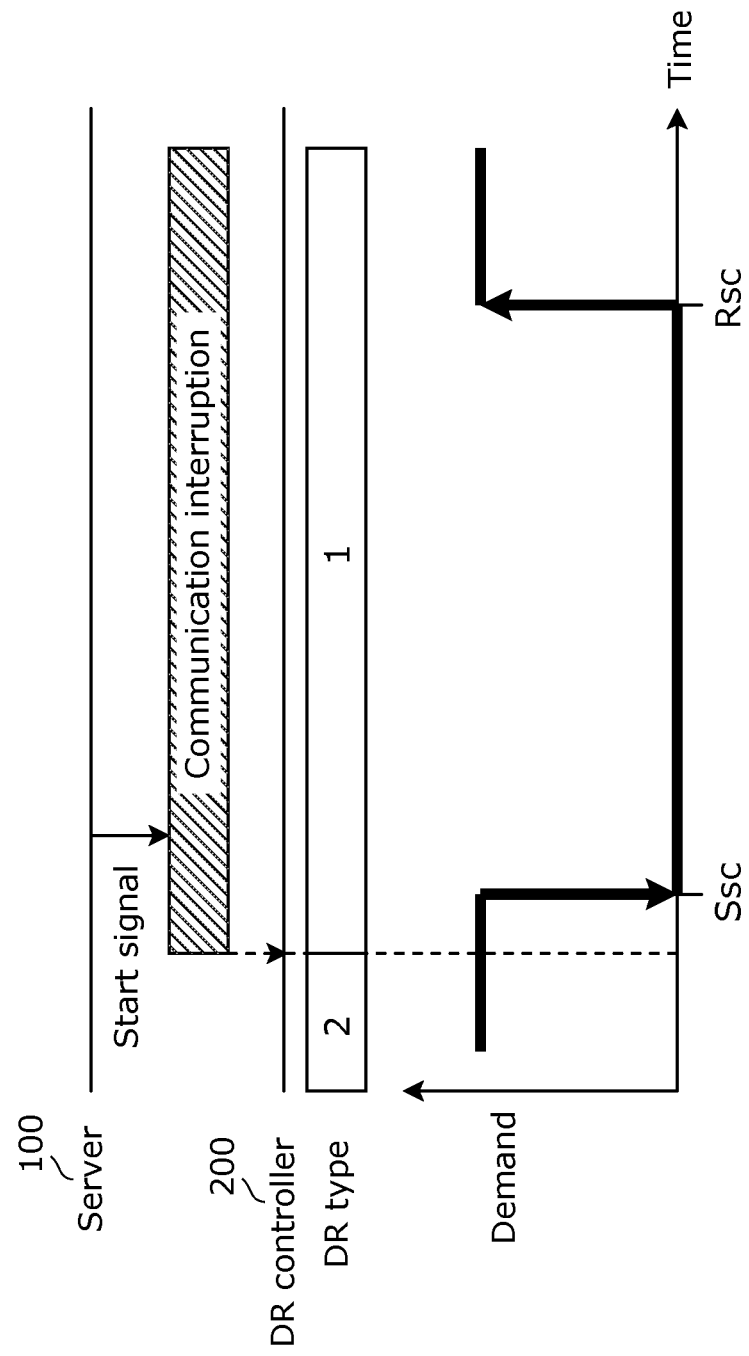
FIG. 16 is a first explanation diagram of a communication status between the server and the DR controller, and power control performed by the DR controller according to Embodiment.

FIG. 16 is a first explanation diagram of a communication status between the server and the DR controller, and power control performed by the DR controller, according to Embodiment.

FIG. 16 illustrates the case where the server 100 transmits a start signal to the DR controller 200 after the communication 101 between the server 100 and the DR controller 200 became unavailable. It is to be noted that the hatched portion in the diagram indicates that communication is unavailable. The same description may be used in other diagrams as well.

In this case, the DR controller 200 changes the DR type from the type 2 to the type 1 when detecting that the communication 101 became unavailable. Then, the DR controller 200 suppresses power demand by the load resource at a power suppression start time (Ssc) according to a power schedule in the type 2, and restores the power demand by the load resource at a power suppression restoration time (Rsc) according to the power schedule. This means that the DR controller 200 executes DR of the type 1, and thus the user obtains an incentive of DR of the type 1.

Figure 17:
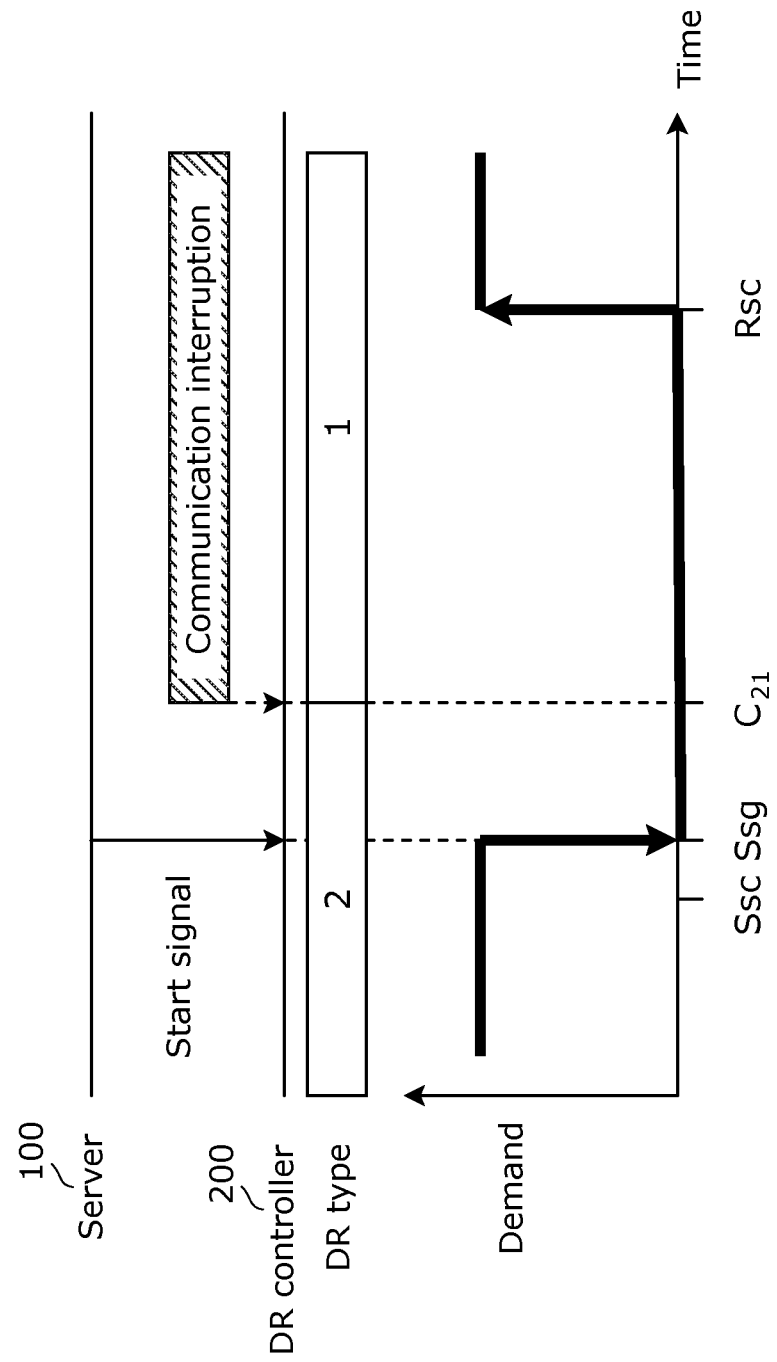
FIG. 17 is a second explanation diagram of a communication status between the server and the DR controller, and power control performed by the DR controller according to Embodiment.

FIG. 17 is a second explanation diagram of a communication status between the server and the DR controller, and power control performed by the DR controller, according to Embodiment.

FIG. 17 illustrates the case where the communication 101 between the server 100 and the DR controller 200 becomes unavailable after the server 100 transmitted a start signal to the DR controller 200.

In this case, the DR controller 200 starts power suppression at the time of receiving the start signal from the server 100 (Ssg). When it is detected at time C12 that the communication 101 between the server 100 and the DR controller 200 becomes unavailable, the DR type is changed from the type 2 to the type 1. Then, the DR controller 200 restores the power demand by the load resource at a power suppression restoration time (Rsc) according to a power schedule of DR of the type 1. This means that the DR controller 200 executes DR of the type 1 for a period from C12 to Rsc, and thus the user obtains an incentive of DR of the type 1 corresponding to this period.

Figure 18:
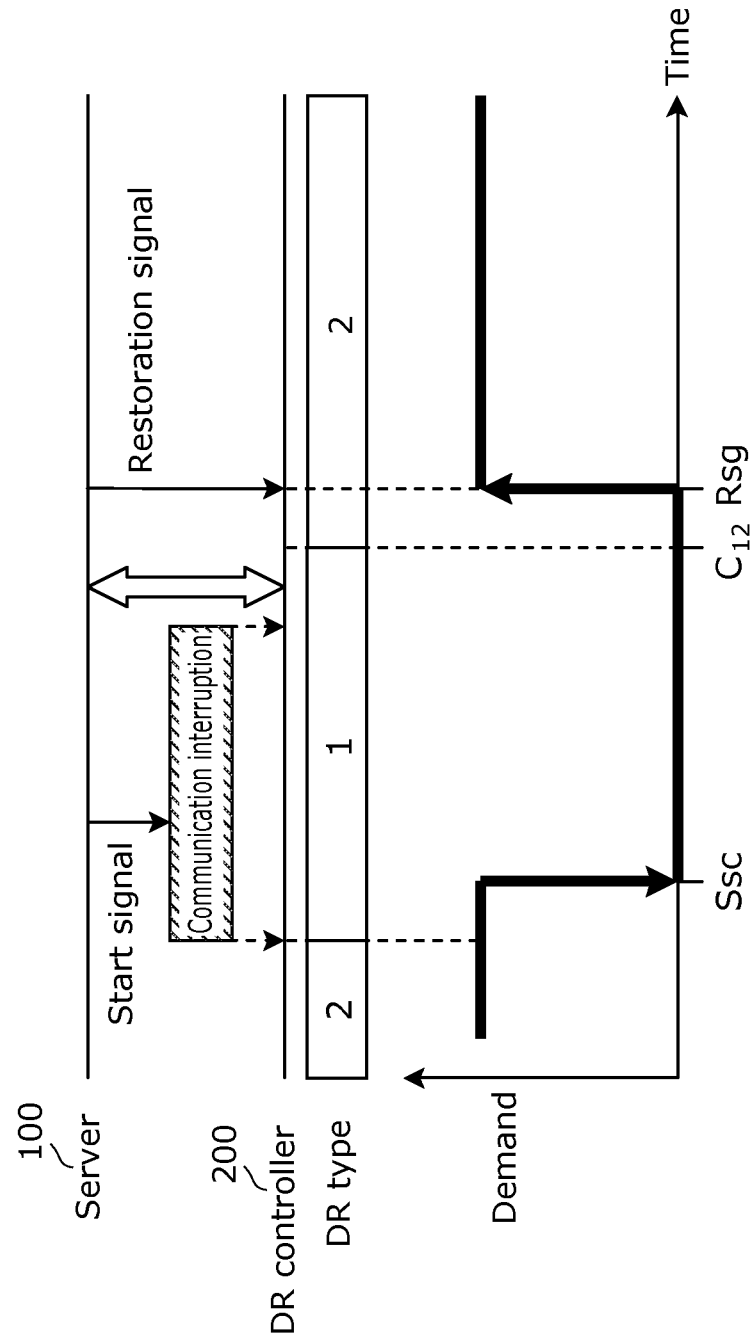
FIG. 18 is a third explanation diagram of a communication status between the server and the DR controller, and power control performed by the DR controller according to Embodiment.

FIG. 18 is a third explanation diagram of a communication status between the server and the DR controller, and power control performed by the DR controller, according to Embodiment.

FIG. 18 illustrates the case where the server 100 transmits a start signal to the DR controller 200 after the communication 101 between the server 100 and the DR controller 200 became unavailable, and the server 100 transmits a restoration signal to the DR controller 200 after the communication 101 between the server 100 and the DR controller 200 was restored.

In this case, the DR controller 200 changes the DR type from the type 2 to the type 1 when detecting that the communication 101 became unavailable. Then, the DR controller 200 suppresses power demand by the load resource at the power suppression start time (Ssc) according to a power schedule in the type 2. Subsequently, when detecting that the communication 101 is restored, the DR controller 200 inquires a current power suppressing state to the server 100. Here, it is notified to the DR controller 200 that the server 100 has not yet transmitted the restoration signal. The DR controller 200, upon receiving the above-described notification, changes the DR type from the type 1 to the type 2 at the time C12, and keeps the suppression state of power demand. Then, the power demand is restored at the time (Rsg) when the restoration signal is received from the server 100. This means that the DR controller 200 executes DR of the type 1 for a period from Ssc to C12, and thus the user obtains an incentive of DR of the type 1 corresponding to this period.

Figure 19:
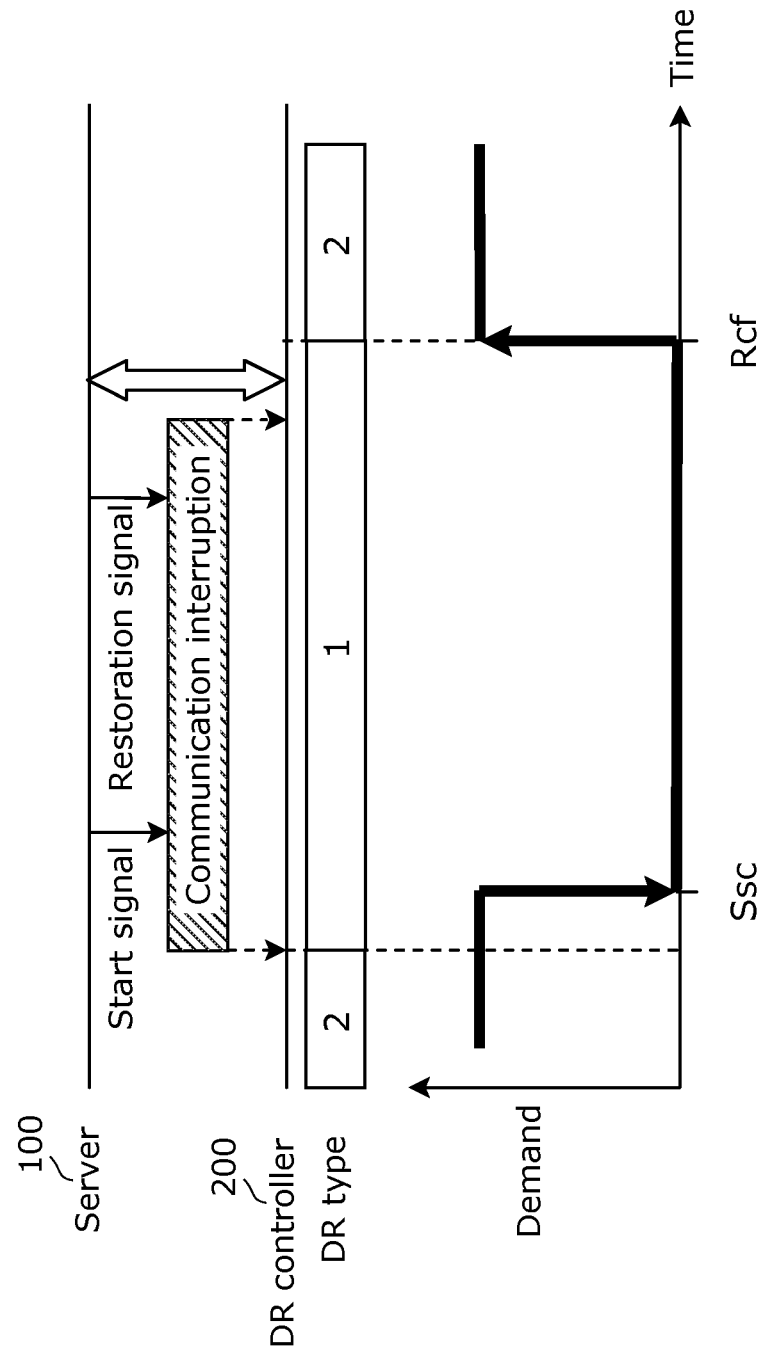
FIG. 19 is a fourth explanation diagram of a communication status between the server and the DR controller, and power control performed by the DR controller according to Embodiment.

FIG. 19 is a fourth explanation diagram of a communication status between the server and the DR controller, and power control performed by the DR controller, according to Embodiment.

FIG. 19 illustrates the case where the server 100 transmits a start signal to the DR controller 200 after the communication 101 between the server 100 and the DR controller 200 became unavailable, and further transmits a restoration signal, and then the communication 101 is restored.

In this case, the operations until the communication 101 is restored are the same as those illustrated in FIG. 18. Subsequently, when detecting that the communication 101 is restored, the DR controller 200 inquires a current power suppressing state to the server 100. Here, it is notified to the DR controller 200 that the server 100 has already transmitted the restoration signal. The DR controller 200, upon receiving the above-described notification, changes the DR type from the type 1 to the type 2 at the time Rcf, and restores the power demand. This means that the DR controller 200 executes DR of the type 1 for a period from Ssc to Rcf, and thus the user obtains an incentive of DR of the type 1 corresponding to this period.

Figure 20:
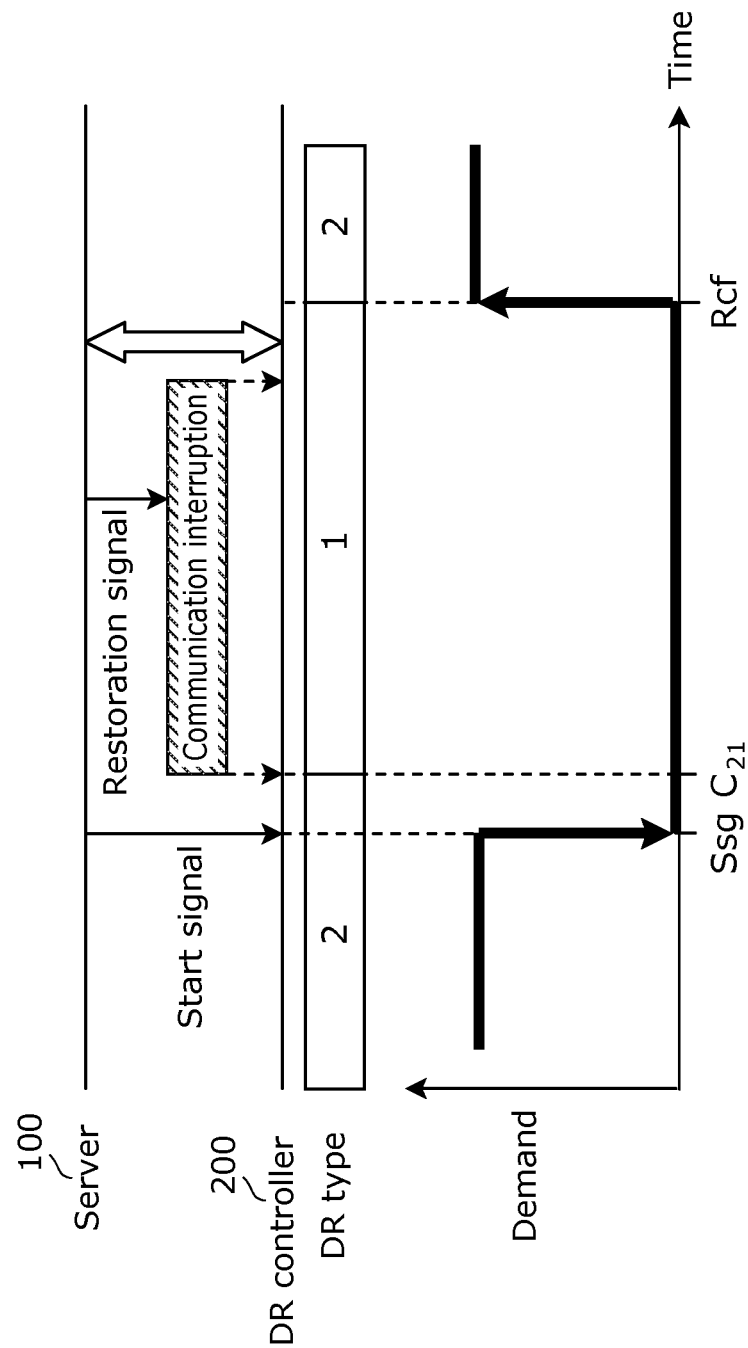
FIG. 20 is a fifth explanation diagram of a communication status between the server and the DR controller, and power control performed by the DR controller according to Embodiment.

FIG. 20 is a fifth explanation diagram of a communication status between the server and the DR controller, and power control performed by the DR controller, according to Embodiment.

FIG. 20 illustrates the case where the server 100 transmits a restoration signal after the communication 101 between the server 100 and the DR controller 200 became unavailable after the server 100 transmitted a start signal to the DR controller 200, and then the communication 101 is restored.

In this case, the operations until the communication 101 is restored are the same as those illustrated in FIG. 17. Subsequently, when detecting that the communication 101 is restored, the DR controller 200 inquires a current power suppressing state to the server 100. Here, it is notified to the DR controller 200 that the server 100 has already transmitted the restoration signal. The DR controller 200, upon receiving the above-described notification, changes the DR type from the type 1 to the type 2 at the time Rcf, and restores the power demand. This means that the DR controller 200 executes DR of the type 1 for a period from C21 to Rcf, and thus the user obtains an incentive of DR of the type 1 corresponding to this period.

Figure 21:
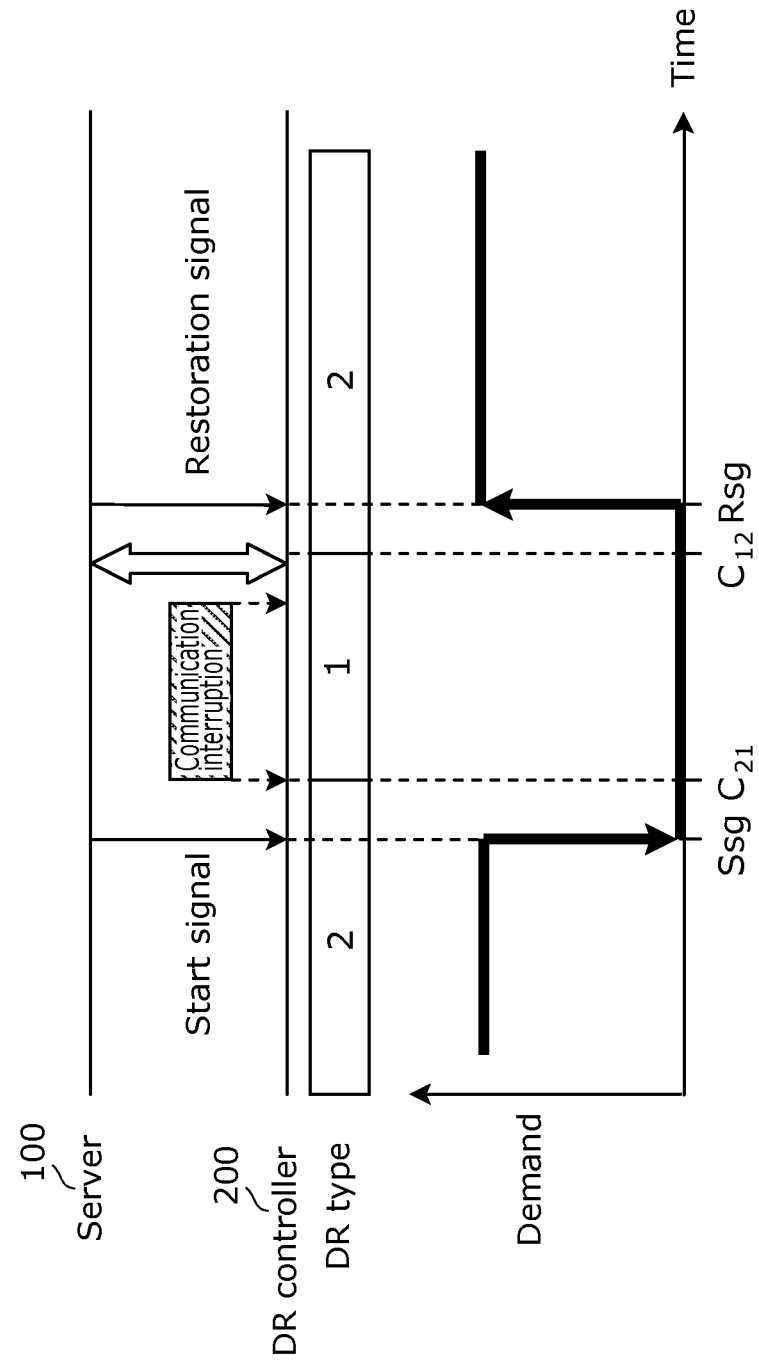
FIG. 21 is a sixth explanation diagram of a communication status between the server and the DR controller, and power control performed by the DR controller according to Embodiment.

FIG. 21 is a sixth explanation diagram of a communication status between the server and the DR controller, and power control performed by the DR controller, according to Embodiment.

FIG. 21 illustrates the case where the communication 101 between the server 100 and the DR controller 200 becomes unavailable after the server 100 transmitted a start signal to the DR controller 200, and the server 100 transmits a restoration signal after the communication 101 was restored.

In this case, the operations until the communication 101 is restored are the same as those illustrated in FIG. 17. Subsequently, when detecting that the communication 101 is restored, the DR controller 200 inquires a current power suppressing state to the server 100. Here, it is notified to the DR controller 200 that the server 100 has not yet transmitted the restoration signal. The DR controller 200, upon receiving the above-described notification, changes the DR type from the type 1 to the type 2 at the time C12, and keeps the suppression state of power demand. This means that the DR controller 200 executes DR of the type 2 for a period from Ssg to Rsg, and thus the user obtains an incentive of DR of the type 2. Here, the DR controller 200 has executed DR of the type 1 in the period from C21 to C12, however, it is substantially the same as executing DR of the type 2, and thus the user can obtain the incentive of the type 2.

Figure 22:
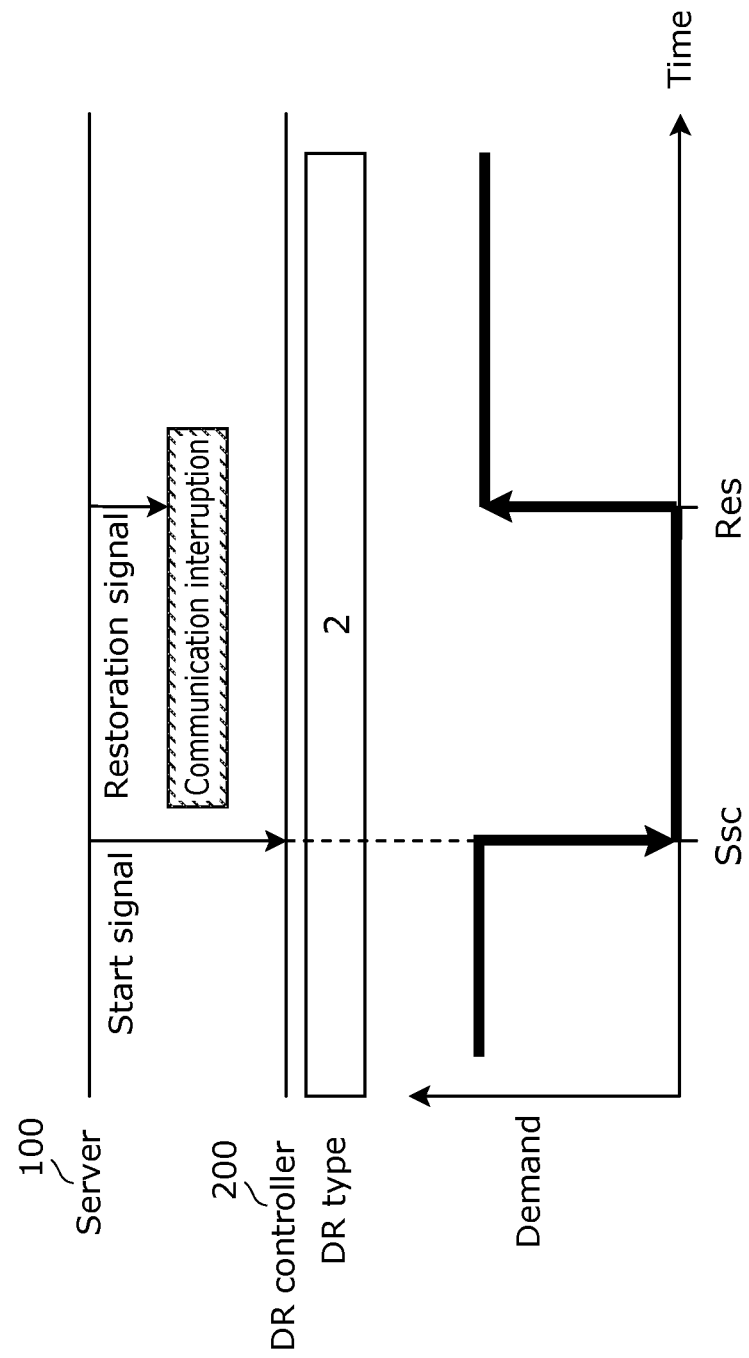
FIG. 22 is a seventh explanation diagram of a communication status between the server and the DR controller, and power control performed by the DR controller according to Embodiment.

FIG. 22 is a seventh explanation diagram of a communication status between the server and the DR controller, and power control performed by the DR controller, according to Embodiment.

FIG. 22 illustrates the case where the server 100 transmits a restoration signal after the communication 101 between the server 100 and the DR controller 200 became unavailable after the server 100 transmitted a start signal to the DR controller 200, and then the communication 101 is restored. It is assumed here that the DR duration estimation unit 143 of the DR controller 200 is capable of estimating a time at which the server 100 transmits a restoration signal.

In this case, the DR controller 200 starts power suppression when receiving the start signal from the server 100 (Ssg). Then, when it is detected, at the time C12, that the communication 101 between the server 100 and the DR controller 200 became unavailable, the time Res at which the restoration signal is to be transmitted by the server 100 is estimated. Then, the DR controller 200 restores the power demand by the load resource at the time Res. This means that the DR controller 200 executes DR of the type 2, and the user obtains an incentive of DR of the type 2

As described above, with the control apparatus according to Embodiment, the control apparatus is capable of controlling a load resource in the first mode in the case where communication with the server becomes unavailable when controlling the load resource in the second mode. The order signal from the server is indispensable for the control apparatus to control the load resource in the second mode. However, the control apparatus is capable of controlling the load resource without the order signal from the server in the first mode. In another words, the control apparatus is capable of continuing to perform control on the load resource by changing the mode so as to control the load resource without an order signal when communication becomes unavailable. Accordingly, the control apparatus is capable of properly controlling the DR even when some troubles occur in the communication tools.

In addition, the control apparatus is capable of controlling the load resource by keeping the second mode when communication with the server is available. In general, the advantageous effect of stabilizing the system power supply is greater when controlling the load resource in the second mode than when controlling the load resource in the first mode. It is therefore desirable to select the second mode to control the load resource when the control apparatus is capable of controlling the load resource either in the first mode or the second mode. This is the reason why the control apparatus keeps the second mode in controlling the load resource as described above.

In addition, the control apparatus is capable of properly starting or ending suppressing of the power demand even in the case where some troubles occur in the communication tools.

In addition, the control apparatus keeps control in the second mode even in the case where communication with the server becomes unavailable when performing control in the second mode. Then, the control apparatus is capable of ending the control on the power demand (restoration) of the load resource at the time estimated by the control unit. With this, it is possible to increase the opportunities to select the second mode which has a greater advantageous effect of stabilizing the system power supply, or lengthen the duration of controlling in the second mode.

In addition, the communication unit is capable of determining availability of communication with the server with high accuracy, by actually performing communication using the confirmation signal and the response signal.

In addition, the control apparatus is capable of obtaining, from the server, a start time or an end time of suppressing power demand of the load resources when controlling in the first mode, and controlling based on the obtained start time or end time.

In addition, the control apparatus is capable of having a proper control status based on a control status in the server in the case where communication is restored after the control apparatus changes a control mode from the second mode to the first mode based on unavailability of communication with the server.

In addition, the control apparatus selects one of the first mode and the second mode to correspond with one of the first power service and the second power service which is selected by the user based on a contract with an aggregator. As a result, the mode selected by the control apparatus is based on the contract of the user. Thus, the control apparatus is capable of controlling the load resource in the first mode or the second mode based on the contract held by the user with the aggregator.

In addition, the control apparatus is capable of controlling the load resource, properly switching the power services among the peak cut supply, the reserve supply, and the frequency regulation based on availability of communication with the server.

In addition, the control apparatus is capable of controlling: a home appliance, an electric vehicle, a storage battery, a battery charger, a hot water heater, a refrigeration compressor, a dishwasher, a clothes dryer, an icemaker, and a swimming pool pump.

In addition, the control apparatus is capable of controlling power demand of the load resource in the second mode according to the obtained start time or end time of the second mode.

It is to be noted that, although the above-described Embodiment can partially or entirely be described as in the additional statements below, the above-described Embodiment is not limited to the descriptions below.

[Additional Statement 1]

A control apparatus which controls a plurality of load resources, includes: a first communication module which receives (i) an identifier for identifying a type of a power service which can be provided by a user to a service provider, and (ii) a service start signal for starting a power service of a first type among a plurality of power services; a second communication module which communicates with the load resources; and a controller which controls, during a power service period, the plurality of load resources via the second communication module, based on the power service of the first type identified by the identifier. When the controller cannot control the plurality of load resources according to the power service of the first type because the first communication module cannot receive the service start signal, the controller changes the power service of the first type to the power service of a second type which is identified by the identifier and can be implemented without receiving the service start signal, and during the power service period, the controller controls the plurality of load resources according to the power service of the second type.

[Additional Statement 2]

With the control apparatus according to Additional statement 1, The service is a demand response activity which includes an activity for changing, by a price signal, change in characteristics of a power system, an event trigger by a service aggregator, and a demand response activation signal, power consumption of the plurality of load resources that are controlled, and which includes for example, but not limited to, peak cut, interruptible load, reserve DR, balancing DR, emergency backup DR, frequency regulation, and so on.

[Additional Statement 3]

With the control apparatus according to Additional statement 1, even when the first communication module cannot receive the service start signal, the controller controls, during the power service period, the plurality of load resources according to the power service of the first type in the case where the control apparatus is capable of estimating at least a start time of the power service.

[Additional Statement 4]

With the control apparatus according to Additional statement 1, when the first communication module receives the service start signal and then becomes unable to communicate, the controller continues to control the plurality of load resources according to the power service of the first type if the controller is capable of estimating end conditions of the power service.

[Additional Statement 5]

With the control apparatus according to Additional statement 4, when the controller cannot estimate the end conditions of the power service period, the controller switches the power service from the power service of the first type to the power service of the second type.

[Additional Statement 6]

With the control apparatus according to Additional statement 1, the first communication module previously receives, from among the plurality of identified power services, one estimation schedule including the start time and the end time of the power service during the power service period.

[Additional Statement 7]

With the control apparatus according to Additional statement 1, the controller estimates a power service schedule of one of the plurality of power services identified by the identifier, by previously receiving a function, software, and/or data via the first communication module.

[Additional Statement 8]

With the control apparatus according to Additional statement 3 the power service of the first type is non-deterministic DR such as the reserve supply and adjustment supply, and the demand response of the second type is deterministic DR such as the peak cut.

[Additional Statement 9]

With the control apparatus according to Additional statement 1, an apparatus which uses electrical energy or thermal energy, an apparatus which generates electrical energy or thermal energy, and/or an apparatus which accumulates electrical energy or thermal energy, are included as the plurality of load resources.

[Additional Statement 10]

With the control apparatus according to Additional statement 1, when the first communication module can obtain the start time and/or an end time of the power service of the first type, the controller causes a service of the second type to start, and at the same time determines a timing for performing the power service of the first type for the plurality of load resources.

[Additional Statement 11]

A control method which controls a plurality of load resources, includes: receiving an identifier for identifying a type of a power service which a user can provide to a service provider, via a first communication unit; and determining a power service of a first type for performing a power service during a predetermined power service period, from among a plurality of service types which are identified, and when a second communication unit cannot receive a start signal for performing the service of the first type, the power service is changed from the service of the first type to a power service of a second type which can be implemented without receiving the start signal, and the plurality of load resources are controlled according to the power service of the second type during the power service period.

[Additional Statement 12]

With the control apparatus according to Additional statement 1, the service is a demand response activity which includes an activity for changing, by a price signal, change in characteristics of a power system, an event trigger by a service aggregator, and a demand response activation signal, power load of load resources that are controlled, and which is a variety of demand response activity such as peak cut, interruptible load, reserve DR, balancing DR, emergency backup DR, frequency regulation, and so on.

Each of the structural elements in each of the above-described embodiments may be configured in the form of an exclusive hardware product, or may be realized by executing a software program suitable for each of the structural elements. Each of the structural elements may be realized by means of a program executing unit, such as a CPU and a processor, reading and executing the software program recorded on a recording medium such as a hard disk or a semiconductor memory. Here, the software program for realizing the control apparatus according to each of the embodiments described above is a program as described below.

To be specific, the program causes a computer to execute a control method performed by a control apparatus which is connected to a server via a network and performs control of power demand of load resources. The control method includes: determining whether or not communication between the server and the control apparatus is available; and executing one of a first mode and a second mode, the first mode being for controlling the power demand of the load resource according to a predetermined schedule, the second mode being for controlling the power demand of the load resource according to an instruction signal from the server, wherein, in the case where it is determined, in the determining, that the communication with the server is unavailable when the control is being performed in the second mode, the second mode is changed to the first mode and the control is performed.

It should be noted that although the control apparatus according to one or more aspects is described based on the aforementioned Embodiment, the present invention is obviously not limited to such Embodiment. Other forms in which various modifications apparent to those skilled in the art are applied to Embodiment, or forms structured by combining structural elements of different aspects of Embodiment may be included within the scope of the one or plurality of aspects, unless such changes and modifications depart from the scope of the present disclosure.

INDUSTRIAL APPLICABILITY

The present invention is applicable to a control apparatus capable of properly controlling DR even when some troubles occur in the communication tools.

REFERENCE SIGNS LIST

1 control system
100 server
101, 202 communication 102 data
103 order
110, 210 communication unit
120 process managing unit
130, 240 memory
140 independent operation supporting unit
141 DR pre-schedule extraction unit
142 DR type change extraction unit
143 DR duration estimation unit
200 DR controller
201 load resource
203 DR service
203u user
204 start time
205 restoration time
211 control unit
214 start signal
215 restoration signal
220 communication determining unit
231 normal operation managing unit
232 independent operation managing unit
241 DR data
242 user data
243 load resource data
250 interface
300 DR purchaser

The invention claimed is:

1. A control apparatus which is connected to a server via a network and performs control on power demand of a load resource, the control apparatus comprising:
   a processor; and
   a non-transitory memory having stored thereon executable instructions, when executed, cause the processor to:
      determine whether or not communication between the server and the control apparatus is available; and
      perform the control by executing one of a first mode for controlling the power demand of the load resource according to a predetermined schedule and a second mode for controlling the power demand of the load resource according to an instruction signal from the server,
   wherein when the processor determines that the communication with the server is unavailable while the control is being performed in the second mode, the processor changes the second mode to the first mode and performs the control by executing the first mode, or
   when the processor determines that the communication with the server is unavailable while the control is being performed in the second mode, the processor does not change the second mode to the first mode and performs the control by executing the second mode when a reception time of a restoration signal can be estimated,
   the control includes restoration control which ends suppressing of the power demand, and
   the restoration signal is the instruction signal from the server, and the restoration signal indicates that the restoration control is to be performed.

2. The control apparatus according to claim 1,
   wherein when the processor determines that the communication with the server is available while the control is being performed in the second mode, the processor does not change the second mode to the first mode and performs the control by executing the second mode.

3. The control apparatus according to claim 1,
   wherein the control further includes start control which starts suppressing of the power demand.

4. The control apparatus according to claim 1,
   wherein the executable instructions further cause the processor to transmit, to the server, a confirmation signal for confirming availability of communication with the server, and determine that communication with the server is available when receiving a response signal transmitted by the server according to the confirmation signal.

5. The control apparatus according to claim 1,
   wherein the executable instructions further cause the processor to obtain, as the predetermined schedule, a schedule which is for performing the control in the first mode and includes a start time for starting suppressing of the power demand and a restoration time for ending the suppressing of the power demand, from the server prior to performing the control by executing one of the first mode or the second mode.

6. The control apparatus according to claim 1,
   wherein when the processor determines that communication with the server is available after changing from the second mode to the first mode, the processor asks the server whether or not the restoration signal has been transmitted by the server, and
   when the restoration signal has been transmitted by the server, the processor changes the first mode to the second mode and performs the control by executing the second mode.

7. The control apparatus according to claim 1,
   wherein the executable instructions further cause the processor to select, based on an instruction from a user, one of a first power service which the control apparatus performs the control according to the predetermined schedule and a second power service which the control apparatus performs the control according to the instruction signal from the server,
   when the processor selects the first power service, the processor performs the control by executing the first mode, and
   when the processor selects the second power service, the processor performs the control by executing the second mode.

8. The control apparatus according to claim 7,
   wherein the first power service is a peak cut supply in which the power demand of the load resource is suppressed during a predetermined period of time, and
   the second power service is one of (i) reserve supply in which the power demand of the load resource is suppressed with timing according to the instruction signal from the server, and (ii) frequency regulation in which the power demand of the load resource is suppressed with timing according to the instruction signal from the server based on a power demand value according to the instruction signal.

9. The control apparatus according to claim 1,
   wherein the load resource includes at least one of: a home appliance; an electric vehicle; a storage battery; a battery charger; a hot water heater; a refrigeration compressor; a dishwasher, a clothes dryer; an icemaker; and a swimming pool pump.

10. The control apparatus according to claim 1,
   wherein, when the processor obtains, from the server, at least one of a start time and an end time of suppressing the power demand in the second mode, the processor changes the control to be performed in the first mode, and controls the power demand of the load resource according to the at least one of the start time and the end time.

11. A control method performed by a control apparatus which is connected to a server via a network and performs control on power demand of a load resource, the control method comprising:
- determining whether or not communication between the server and the control apparatus is available; and
- executing one of a first mode for controlling the power demand of the load resource according to a predetermined schedule and a second mode for controlling the power demand of the load resource according to an instruction signal from the server,
- wherein when it is determined that the communication with the server is unavailable while the control is being performed in the second mode, the second mode is changed to the first mode and the control is performed by executing the first mode, or
- when it is determined that the communication with the server is unavailable while the control is being performed in the second mode, the second mode is not changed to the first mode and the control is performed by executing the second mode when a reception time of a restoration signal can be estimated,
- the control includes restoration control which ends suppressing of the power demand, and
- the restoration signal is the instruction signal from the server, and the restoration signal indicates that the restoration control is to be performed.

12. A control system comprising:
the control apparatus and the server according to claim 1.

* * * * *